(12) United States Patent
Saida et al.

(10) Patent No.: US 10,322,967 B2
(45) Date of Patent: Jun. 18, 2019

(54) DISPERSANT COMPOSITION FOR HYDRAULIC COMPOSITION

(71) Applicant: KAO CORPORATION, Tokyo (JP)

(72) Inventors: Kazuya Saida, Wakayama (JP); Koji Koyanagi, Wakayama (JP); Masaaki Shimoda, Wakayama (JP); Shunya Tanaka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 35 days.

(21) Appl. No.: 15/552,656

(22) PCT Filed: Mar. 17, 2016

(86) PCT No.: PCT/JP2016/058587
§ 371 (c)(1),
(2) Date: Aug. 22, 2017

(87) PCT Pub. No.: WO2016/148258
PCT Pub. Date: Sep. 22, 2016

(65) Prior Publication Data
US 2018/0029935 A1 Feb. 1, 2018

(30) Foreign Application Priority Data
Mar. 17, 2015 (JP) ................................. 2015-053368

(51) Int. Cl.
| | | |
|---|---|---|
| C04B 24/22 | (2006.01) | |
| C04B 28/02 | (2006.01) | |
| C08L 61/00 | (2006.01) | |
| C04B 24/32 | (2006.01) | |
| C04B 28/04 | (2006.01) | |
| C04B 40/00 | (2006.01) | |
| C08G 16/02 | (2006.01) | |
| C04B 103/40 | (2006.01) | |
| C04B 103/50 | (2006.01) | |
| C04B 111/00 | (2006.01) | |

(52) U.S. Cl.
CPC ............ *C04B 24/226* (2013.01); *C04B 24/32* (2013.01); *C04B 28/02* (2013.01); *C04B 28/04* (2013.01); *C04B 40/0039* (2013.01); *C04B 40/0042* (2013.01); *C08L 61/00* (2013.01); C04B 2103/408 (2013.01); C04B 2103/50 (2013.01); C04B 2111/00637 (2013.01); C08G 16/02 (2013.01)

(58) Field of Classification Search
CPC ....... C04B 24/226; C04B 28/04; C04B 24/32; C04B 2103/408; C08L 61/00
USPC .......................................................... 524/2
See application file for complete search history.

(56) References Cited

U.S. PATENT DOCUMENTS

| | | | | |
|---|---|---|---|---|
| 5,362,323 A | * | 11/1994 | Koyata | ............... C04B 24/2664 106/709 |
| 2004/0250737 A1 | * | 12/2004 | Yaguchi | ................. C04B 24/02 106/808 |
| 2008/0078550 A1 | * | 4/2008 | Chatterji | ................ C04B 28/02 166/293 |

FOREIGN PATENT DOCUMENTS

| | | |
|---|---|---|
| EP | 1433768 A1 | 6/2004 |
| JP | 48-028525 A | 4/1973 |
| JP | 50-150724 A | 12/1975 |
| JP | 54-153829 A | 12/1979 |
| JP | 55-023047 A | 2/1980 |
| JP | 60-011255 A | 1/1985 |
| JP | 61-197456 A | 9/1986 |
| JP | 61197456 * | 9/1986 |
| JP | 61-281054 A | 12/1986 |
| JP | 62-3060 A | 1/1987 |
| JP | 62003060 * | 1/1987 |
| JP | 8-231256 A | 9/1996 |
| JP | 2002068820 * | 3/2002 |
| JP | 2003-165755 A | 6/2003 |
| JP | 2007-261119 A | 10/2007 |
| WO | WO 03/24885 A2 | 3/2003 |

OTHER PUBLICATIONS

Translation of JP 2002-068820, Mar. 8, 2002. (Year: 2002).*
Translation of "Substituent," Chemistry Dictionary, First Edition, 7th Issue, published by Tokyo Kagaku Dojin, Co. Ltd., Apr. 1, 2003, 1 page.
International Preliminary Report on Patentability and the English translation of the Written Opinion of the International Searching Authority (Forms PCT/IB/373 and PCT/ISA/237), dated Sep. 19, 2017, for International Application No. PCT/JP2016/058587.
International Search Report (PCT/ISA/210) issued in PCT/JP2016/058587, dated May 31, 2016.
Extended European Search Report for corresponding European Application No. 16765087.8, dated Oct. 22, 2018.
Hamaguchi et al., "Admixture compositions for cements," Chemical Abstracts, vol. 106, No. 18, May 4, 1987, XP000183847, p. 303.

* cited by examiner

*Primary Examiner* — Hui H Chin
(74) *Attorney, Agent, or Firm* — Birch, Stewart, Kolasch & Birch, LLP

(57) ABSTRACT

The present invention is a dispersant composition for a hydraulic composition, which includes (A) a polymer compound having a naphthalene ring-containing monomer unit and (B) a specific alkylene oxide added compound represented by the general formulas (B1) to (B3), wherein a molar ratio of a total amount of the component (B) to the naphthalene ring-containing monomer unit in the component (A) is 0.4% or more and 30% or less.

19 Claims, No Drawings

DISPERSANT COMPOSITION FOR HYDRAULIC COMPOSITION

FIELD OF THE INVENTION

The present invention relates to a dispersant composition for a hydraulic composition, a dispersant composition for an inorganic powder, a hydraulic composition, a method for manufacturing a dispersant composition for a hydraulic composition, a method for manufacturing a hydraulic composition, and a method for improving dispersing performance.

BACKGROUND OF THE INVENTION

Dispersants for a hydraulic composition are chemical admixtures, and used for dispersing cement particles, thereby reducing a unit water quantity necessary for achieving a required slump and enhancing workability and the like of a hydraulic composition. Examples of conventionally-known dispersants include naphthalene-based dispersants such as a formaldehyde naphthalenesulfonate condensate, polycarboxylic acid-based dispersants such as a copolymer of a monomer having a carboxylic acid and a monomer having an alkylene glycol chain, and melamine-based dispersants such as a melaminesulfonic acid-formaldehyde condensate.

Compared to polycarboxylic acid-based dispersants and melamine-based dispersants, naphthalene-based dispersants are characterized in that they have smaller fluctuations in exhibiting the fluidity in response to changes of materials or temperatures, a hydraulic composition obtained thereby has a relatively low viscosity, and they are easy to use in manufacturing a hydraulic composition.

JP-A 61-281054 describes a chemical admixture for concrete, which contains a cement dispersant and a specific nonionic surfactant at a predetermined weight ratio.

JP-A 2003-165755 describes a workability-improving agent for improving workability of a cement composition, which contains a specific polyalkylene oxide derivative and/or a specific hydrocarbon derivative. JP-A 2003-165755 also describes a cement water-reducing agent containing the workability-improving agent and a water-reducing agent.

JP-A 55-023047 describes a slurry, which is composed of water and a hydraulic composition containing a 0 naphthalenesulfonic acid formaldehyde condensate and a nonionic surfactant having an oxyethylene chain.

JP-A 60-011255 describes a cement additive, which is composed of a formalin condensate of a metal salt of naphthalenesulfonate and a polyoxyethylene-based compound.

JP-A 48-028525 describes a method for manufacturing a concrete product, which includes molding a desired concrete product with concrete additionally containing an anionic surfactant, and performing atmospheric pressure steam curing of the molded product.

Meanwhile, use of a surfactant as a cement chemical admixture has been conventionally proposed. JP-A 50-150724 describes a cement chemical admixture, which contains an anionic surfactant of sulfuric ester type and a polyoxyalkylene- or polyhydric alcohol-based nonionic surfactant.

SUMMARY OF THE INVENTION

The present invention provides a dispersant composition for a hydraulic composition, which provides a hydraulic composition with excellent fluidity.

The present invention relates to a dispersant composition for a hydraulic composition, which contains:

(A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 1]

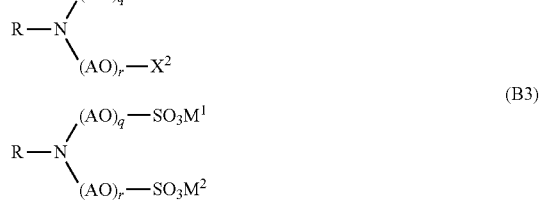

wherein:

R is a hydrophobic group containing a carbon atom;

AO is an alkyleneoxy group having carbon number of 2 or more and 4 or less;

p represents an average number of AO moles added and is 1 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

The dispersant composition for a hydraulic composition of the present invention includes a dispersant composition for a hydraulic composition, which includes (A) a polymer compound having a naphthalene ring-containing monomer unit; and (B) one or two or more compounds selected from a compound represented by the general formula (B1), a compound represented by the general formula (B2) and a compound represented by the general formula (B3), wherein a molar ratio of a total amount of (B) to the naphthalene ring-containing monomer unit in (A) is 1% or more and 30% or less.

Further, the present invention relates to a hydraulic composition, which contains a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 2]

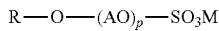
(B1)

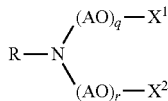
(B2)

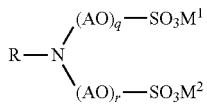
(B3)

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

The hydraulic composition of the present invention includes a hydraulic composition, which contains a hydraulic powder, water, (A) a polymer compound having a naphthalene ring-containing monomer unit, and (B) one or two or more compounds selected from a compound represented by the general formula (B1), a compound represented by the general formula (B2) and a compound represented by the general formula (B3),
wherein a molar ratio of a total amount of (B) to the naphthalene ring-containing monomer unit in (A) is 1% or more and 30% or less.

Furthermore, the present invention relates to a method for manufacturing a dispersant composition for a hydraulic composition, wherein the dispersant composition contains: (A) a polymer compound having a naphthalene ring-containing monomer unit; and (B) one or two or more compounds selected from a compound represented by the following general formula (B1), a compound represented by the following general formula (B2) and a compound represented by the following general formula (B3),
wherein the method includes mixing (A) and (B) so that a molar ratio of a total amount of (B) to the naphthalene ring-containing monomer unit in (A) is 0.4% or more and 30% or less,

[Chemical Formula 3]

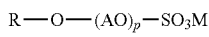
(B1)

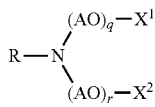
(B2)

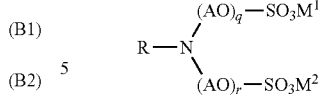
(B3)

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

The method of the present invention for manufacturing a dispersant composition for a hydraulic composition includes a method for manufacturing a dispersant composition for a hydraulic composition, wherein the dispersant composition contains: (A) a polymer compound having a naphthalene ring-containing monomer unit; and (B) one or two or more compounds selected from a compound represented by the general formula (B1), a compound represented by the general formula (B2) and a compound represented by the general formula (B3),
wherein the method includes mixing (A) and (B) so that a molar ratio of a total amount of (B) to the naphthalene ring-containing monomer unit in (A) is 1% or more and 30% or less.

Further, the present invention relates to a method for manufacturing a hydraulic composition, wherein the hydraulic composition contains: a hydraulic powder, water, (A) a polymer compound having a naphthalene ring-containing monomer unit; and (B) one or two or more compounds selected from a compound represented by the following general formula (B1), a compound represented by the following general formula (B2) and a compound represented by the following general formula (B3),
wherein the method includes mixing (A) and (B) so that a molar ratio of a total amount of (B) to the naphthalene ring-containing monomer unit in (A) is 0.4% or more and 30% or less,

[Chemical Formula 4]

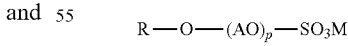
(B1)

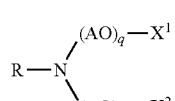
(B2)

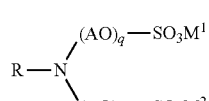
(B3)

wherein:

R is a hydrophobic group containing a carbon atom;

AO is an alkyleneoxy group having a carbon number of 2 or more and 4 or less;

p represents an average number of AO moles added and is 1 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

The method of the present invention for manufacturing a hydraulic composition includes a method for manufacturing a hydraulic composition, wherein the hydraulic composition contains a hydraulic powder, water, (A) a polymer compound having a naphthalene ring-containing monomer unit, and (B) one or two or more compounds selected from a compound represented by the general formula (B1), a compound represented by the general formula (B2) and a compound represented by the general formula (B3), wherein the method includes mixing (A) and (B) so that a molar ratio of a total amount of (B) to the naphthalene ring-containing monomer unit in (A) is 1% or more and 30% or less.

Furthermore, the present invention relates to, in preparing a hydraulic composition by mixing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), a method for improving dispersing performance of (A) for the hydraulic powder, wherein the method includes adding (B), the one or two or more compounds selected from a compound represented by the following general formula (B1), a compound represented by the following general formula (B2) and a compound represented by the following general formula (B3) so that a molar ratio of a total amount of (B) to the naphthalene ring-containing monomer unit in (A) is 0.4% or more and 30% or less,

[Chemical Formula 5]

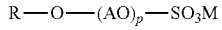
(B1)

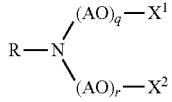
(B2)

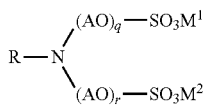
(B3)

wherein:

R is a hydrophobic group containing a carbon atom;

AO is an alkyleneoxy group having a carbon number of 2 or more and 4 or less;

p represents an average number of AO moles added and is 1 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

The method of the present invention for improving dispersing performance includes, in preparing a hydraulic composition by mixing a hydraulic powder, water, (A) a polymer compound having a naphthalene ring-containing monomer unit, and (B) one or two or more compounds selected from a compound represented by the general formula (B1), a compound represented by the general formula (B2) and a compound represented by the general formula (B3), a method for improving dispersing performance of (A) for the hydraulic powder, wherein the method includes adding (B), the one or two or more compounds selected from a compound represented by the general formula (B1), a compound represented by the general formula (B2) and a compound represented by the general formula (B3) so that a molar ratio of a total amount of (B) to the naphthalene ring-containing monomer unit in (A) is 1% or more and 30% or less.

Further, the present invention relates to a dispersant composition for an inorganic powder, wherein the dispersant composition contains: (A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 6]

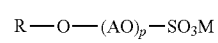
(B1)

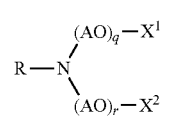
(B2)

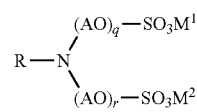
(B3)

wherein:

R is a hydrophobic group containing a carbon atom;

AO is an alkyleneoxy group having a carbon number of 2 or more and 4 or less;

p represents an average number of AO moles added and is 1 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

The dispersant composition for an inorganic powder of the present invention includes a dispersant composition for an inorganic powder, which contains: (A) a polymer compound having a naphthalene ring-containing monomer unit; and (B) one or two or more compounds selected from a compound represented by the general formula (B1), a compound represented by the general formula (B2) and a compound represented by the general formula (B3), wherein a molar ratio of a total amount of (B) to the naphthalene ring-containing monomer unit in (A) is 1% or more and 30% or less.

Hereinafter, (A) a polymer compound having a naphthalene ring-containing monomer unit is referred to as component (A); and (B) a compound represented by the following general formula (B1), a compound represented by the following general formula (B2) and a compound represented by the following general formula (B3) are collectively referred to as component (B).

According the present invention, a dispersant composition for a hydraulic composition is provided, so that a hydraulic composition with excellent fluidity is obtained.

Further, according to the present invention, a dispersant composition for an inorganic powder is provided, so that a slurry with excellent fluidity is obtained.

DETAILED DESCRIPTION OF THE INVENTION

[Dispersant Composition for Hydraulic Composition]

A mechanism for exhibiting effects of the present invention is unknown, but assumed as follows.

A naphthalene ring contained in component (A) and a group R contained in component (B) have a molecular structure with high hydrophobicity. Then, it is believed that, due to their high hydrophobicity, the naphthalene ring contained in component (A) and the group R contained in component (B) exist collectively in order to be stably present in water, and thereby, components (A) and (B) form a pseudo associate. Further, since the component (B) has a sulfonic acid group and/or a plurality of AO groups therein, it is considered that the hydrophilicity and the repulsive force of the entire associate are enhanced. Thus, it is inferred that when a molar ratio of a total amount of the component (B) to a naphthalene ring-containing monomer unit in the component (A) is 0.4% or more and 30% or less, the repulsive force that cannot be obtained only by the component (A) and the adsorbing power to a hydraulic powder that cannot be obtained only by the component (B) are exhibited in a well-balanced manner, thereby improving the fluidity of a hydraulic composition.

<Component (A)>

Component (A) is a polymer compound having a naphthalene ring-containing monomer unit. The component (A) can be used as a dispersant for a hydraulic composition containing a hydraulic powder such as cement or gypsum.

Preferred examples of the component (A) include formaldehyde naphthalenesulfonate condensates or salts thereof. Formaldehyde naphthalenesulfonate condensates or salts thereof are a condensate of naphthalenesulfonic acid and formaldehyde or salts thereof. A formaldehyde naphthalenesulfonate condensate may be co-condensated with an aromatic compound capable of co-condensating with a naphthalenesulfonate, as a monomer, for example, methylnaphthalene, ethylnaphthalene, butylnaphthalene, hydroxynaphthalene, naphthalene carboxylic acid, anthracene, phenol, cresol, creosote oil, tar, melamine, urea, sulfanilic acid and/or derivatives thereof as long as it does not impair the performance.

Examples of formaldehyde naphthalenesulfonate condensates or salts thereof to be used include commercially available products such as Mighty 150, Demol N, Demol RN, Demol MS, Demol SN-B, and Demol SS-L (all manufactured by Kao Corporation); and Cellflow 120, Lavelin FD-40, and Lavelin FM-45 (all manufactured by DKS Co., Ltd.).

The formaldehyde naphthalenesulfonate condensate or the salt thereof has, from the viewpoint of fluidity improvement of a hydraulic composition, a weight average molecular weight of preferably 200,000 or less, more preferably 100,000 or less, further preferably 80,000 or less, further more preferably 50,000 or less, and further more preferably 30,000 or less. The formaldehyde naphthalenesulfonate condensate or the salt thereof has, from the viewpoint of fluidity improvement of a hydraulic composition, a weight average molecular weight of preferably 1,000 or more, more preferably 3,000 or more, further preferably 4,000 or more, and further more preferably 5,000 or more. The formaldehyde naphthalenesulfonate condensate may be in an acidic state or a neutralized product.

The molecular weight of a formaldehyde naphthalenesulfonate condensate or a salt thereof can be measured using a gel permeation chromatography under the following conditions.

[GPC Condition]
Column: G4000SWXL+G2000SWXL (Tosoh Corporation)
Eluent: 30 mM $CH_3COONa/CH_3CN=6/4$
Flow rate: 0.7 ml/min
Detection: UV 280 nm
Sample size: 0.2 mg/ml
Standard substance: in terms of sodium polystyrene sulfonate (monodispersed sodium polystyrene sulfonate: molecular weight, 206, 1800, 4000, 8000, 18000, 35000, 88000, 780000) manufactured by Nishio Kogyo Kabushiki Kaisha
Detector: UV-8020 (Tosoh Corporation)

A method for manufacturing a formaldehyde naphthalenesulfonate condensate or a salt thereof includes, for example, a method for obtaining a condensate by condensation reaction of a naphthalenesulfonate with formaldehyde. The condensate may be neutralized. Further, a water insoluble substance generated as a by-product of neutralization may be removed. Specifically, in order to obtain a naphthalenesulfonate, 1.2 to 1.4 mol of sulfuric acid is used relative to 1 mol of naphthalene and reacted with each other for 2 to 5 hours at 150° C. to 165° C., so that a sulfonated product is obtained. Next, formalin is added dropwise at 85° C. to 95° C. for 3 to 6 hours to provide 0.95 to 0.99 mol of formaldehyde relative to 1 mol of the sulfonated product, and condensation reaction is conducted at 95° C. to 105° C. after the dropwise addition. Further, due to an aqueous solution of the obtained condensate having a high acidity, from the viewpoint of preventing metallic corrosion of a storage tank or the like, water and a neutralizer are added to the obtained condensate and they may be subjected to neutralizing process at 80° C. to 95° C. It is preferred that the 1.0 to 1.1 mol times of neutralizer be added to the naphthalenesulfonate and unreacted sulfuric acid. Further, as a method for removing a water insoluble product generated by neutralization, separation by filtration is preferred. Through these processes, an aqueous solution of a water soluble salt of formaldehyde naphthalenesulfonate condensate is obtained. This aqueous solution can be used as-is as an aqueous solution of component (A). Further, if needed, the aqueous solution is dried and powdered, and a powdered salt of formaldehyde naphthalenesulfonate condensate can be obtained, and this may be used as a powdered dispersant. Drying and reduction to powder can be conducted by spray drying, drum drying, freeze-drying or the like.

From the viewpoint of the fluidity improvement, the dispersant composition for a hydraulic composition of the present application contains the component (A) in solid content in an amount of preferably 5 mass % or more, more preferably 25 mass % or more, further preferably 50 mass % or more, and further more preferably 55 mass % or more; and preferably 99 mass % or less, more preferably 97 mass % or less, further preferably 95 mass % or less, further more preferably 90 mass % or less, further more preferably 85 mass % or less, and further more preferably 75 mass % or less.

Note that, regarding the dispersant composition for a hydraulic composition, the solid content refers to components other than water.

<Component (B)>

Component (B) is one or two or more compounds selected from compounds represented by the general formula (B1), compounds represented by the general formula (B2) and compounds represented by the general formula (B3).

The component (B) has a structure wherein a carbon atom-containing hydrophobic group and a (poly)alkyleneoxy group are coupled via an oxygen atom or a nitrogen atom. When an oxygen atom is used for coupling, the component is a compound having a sulfuric ester group at terminal of the (poly)alkyleneoxy group. When a nitrogen atom is used for coupling, the component is a compound having a sulfuric ester group, a hydroxyl group or an ether group at terminal of the (poly)alkyleneoxy group.

The present invention provides a dispersant composition for a hydraulic composition, wherein the component (B) is one or two or more compounds selected from compounds represented by the general formula (B1).

The present invention provides a dispersant composition for a hydraulic composition, wherein the component (B) is one or two or more compounds selected from compounds represented by the general formula (B2).

The present invention provides a dispersant composition for a hydraulic composition, wherein the component (B) is one or two or more compounds selected from compounds represented by the general formula (B3).

The present invention provides a dispersant composition for a hydraulic composition, wherein the component (B) is one or two or more compounds selected from compounds represented by the general formula (B1) and compounds represented by the general formula (B2).

The present invention provides a dispersant composition for a hydraulic composition, wherein the component (B) is one or two or more compounds selected from compounds represented by the general formula (B1) and compounds represented by the general formula (B3).

The present invention provides a dispersant composition for a hydraulic composition, wherein the component (B) is one or two or more compounds selected from compounds represented by the general formula (B2) and compounds represented by the general formula (B3).

The component (B) is preferably a compound represented by the general formula (B1).

In the general formulas (B1), (B2) and (B3), R is a carbon atom-containing hydrophobic group. With respect to R, the hydrophobic group used herein is a group which provides an HLB of a compound in the form of R—H of 2.25 or less.

R is a monovalent group.

In other words, R is a group obtained by removing one hydrogen atom from a compound containing a carbon atom, represented by R—H, and having an HLB of 2.25 or less.

The present invention covers a dispersant composition for a hydraulic composition, in which R in the general formulas (B1), (B2) and (B3) is a carbon atom-containing group, and is a group providing an HLB of a compound in the form of R—H of 2.25 or less.

Further, the present invention covers a dispersant composition for a hydraulic composition, in which R in the general formulas (B1), (B2) and (B3) is a hydrocarbon group, and is a group providing an HLB of a compound in the form of R—H of 2.25 or less.

Further, the present invention covers a dispersant composition for a hydraulic composition, wherein R in the general formulas (B1), (B2) and (B3) is a hydrocarbon group having a carbon number of 10 or more and 27 or less and a substituent-containing hydrocarbon group having a carbon number of 10 or more and 30 or less.

The HLB of R—H is preferably 1.30 or less, more preferably 0.35 or less, and further preferably −0.6 or less; and preferably −5.83 or more, more preferably −5.35 or more, and further preferably −4.40 or more. The HLB of R—H is determined by Davies method.

The HLB of R—H is considered as a factor that is involved in the strength of hydrophobic interaction of a compound represented by the general formula (B1), (B2) or (B3) having a corresponding R.

For example, a surfactant forms a micelle or the like with a hydrophilic group at water side and a hydrophobic group inside for stable presence in water, and this reduces an area of the hydrophobic group in contact with water as much as possible. A naphthalene ring contained in the component (A) has a structure with an extremely high hydrophobicity, and the group R contained in the component (B) also has a structure with a very high hydrophobicity by having an HLB of R—H of 2.25 or less. Thus, in water, in order to reduce a contact area with water, the naphthalene ring of the component (A) and the group R of the component (B) exist together as hydrophobic groups. As a result, it is considered that an associate suitable to exhibit the effects of the present invention is formed. In the present invention, the group R having an HLB of R—H of 2.25 or less is contained in the component (B), and this allows the components (A) and (B) to form an associate; and as a result, a repulsive force, which cannot be obtained only by the component (A) and an adsorbing force, which cannot be obtained only by the component (B) are exhibited and it is thus inferred that the fluidity of a hydraulic composition is improved. That is, it is considered that the group R has a greater impact on the formation of an associate suitable to exhibit the effects of the present invention than the group AO contained in the component (B).

In the general formulas (B1), (B2) and (B3), examples of R include groups selected from hydrocarbon groups and substituent-containing hydrocarbon groups.

Examples of the hydrocarbon group include an alkyl group, an alkenyl group, an aralkyl group, an aryl group and an aryl group with a substituent (hereinafter, referred to as a substituted aryl group). The hydrocarbon group is preferably a group selected from an alkyl group, an alkenyl group and a substituted aryl group.

A substituent is an atom or an atomic group, which is introduced instead of a most basic hydrogen atom in an organic compound (KAGAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

The carbon number of R may be selected from preferably 10 or more, and more preferably 12 or more; and preferably 30 or less, more preferably 27 or less, further preferably 26 or less, and further more preferably 24 or less.

The alkyl group for R is preferably an aliphatic alkyl group, more preferably a linear aliphatic alkyl group, and further preferably a linear primary aliphatic alkyl group.

The alkenyl group for R is preferably an aliphatic alkenyl group, more preferably a linear aliphatic alkenyl group, and further preferably a linear primary aliphatic alkenyl group.

The term "primary" used herein for an alkyl group and an alkenyl group means that, among carbon atoms of the alkyl group or the alkenyl group, a carbon atom to be coupled to other group is a primary carbon atom. For example, among carbon atoms of the alkyl group or the alkenyl group in R, it means that a carbon atom to be coupled to O or N is a primary carbon atom.

The substituted aryl group for R is an aryl group wherein a hydrogen atom of an aromatic ring is replaced with a substituent, and examples thereof include an aryl group wherein a hydrogen atom of an aromatic ring is substituted by a hydrocarbon group. Examples of the substituted aryl group include aryl groups wherein one, two or three hydrogen atoms of an aromatic ring are substituted by a substituent such as a hydrocarbon group. A phenyl group is preferred as an aryl group for the substituted aryl group. Further, examples include substituted aryl groups having a carbon number of 13 or more and 30 or less.

Examples of the substituted aryl group include groups selected from a phenyl group substituted by an alkyl group having a carbon number of preferably 1 or more, more preferably 2 or more, and preferably 10 or less, and more preferably 8 or less; a phenyl group substituted by a benzyl group; and a styrenated phenyl group. Examples of the substituted aryl group include groups selected from a phenyl group substituted by a benzyl group and a styrenated phenyl group.

The substituted aryl group is a group preferably selected from a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; and a group more preferably selected from a tribenzyl phenyl group and a distyrenated phenyl group.

From an economic viewpoint, R is preferably an alkyl group.

From the viewpoint of the easy solubility in water, R is preferably an alkenyl group.

From the viewpoint of the low foaming property, R is preferably a substituted-aryl group.

Examples of the alkyl group or alkenyl group for R include a decyl group, a lauryl group, a myristyl group, a palmityl group, a stearyl group, a behenyl group, an isostearyl group, and an oleyl group; from the viewpoint of the fluidity improvement, preferably a lauryl group, a myristyl group, a palmityl group, a stearyl group, a behenyl group, an isostearyl group, and an oleyl group; and more preferably a lauryl group, a myristyl group, a palmityl group, a stearyl group, and an oleyl group.

R in the general formula (B1) is preferably a group selected from an alkyl group, an alkenyl group and a substituted-aryl group.

Examples of R in the general formula (B1) include groups selected from a decyl group, a lauryl group, a myristyl group, a palmityl group, a stearyl group, a behenyl group, an isostearyl group, an oleyl group, a monobenzyl phenyl group, a dibenzyl phenyl group, a tribenzyl phenyl group, a monostyrenated phenyl group, and a distyrenated phenyl group. From the viewpoint of the fluidity improvement, preferred is a group selected from a lauryl group, a myristyl group, a palmityl group, a stearyl group, a behenyl group, an isostearyl group, an oleyl group, a monobenzyl phenyl group, a dibenzyl phenyl group, a tribenzyl phenyl group, a monostyrenated phenyl group, and a distyrenated phenyl group; and more preferred is a group selected from a lauryl group, a myristyl group, a palmityl group, a stearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group.

Specific examples of R include groups selected from a hydrocarbon group having a carbon number of 10 or more, and more preferably 12 or more; and preferably 27 or less, more preferably 26 or less, and further preferably 24 or less; and a hydrocarbon group, in which a hydrogen atom of the hydrocarbon group is substituted by a substituent.

Other specific examples of R include groups selected from an alkyl group or an alkenyl group having a carbon number of 10 or more, and more preferably 12 or more; and preferably 27 or less, more preferably 26 or less, and further preferably 24 or less, and a group wherein a hydrogen atom of the alkyl or alkenyl group is substituted by a substituent; and a hydrocarbon-substituted aryl group, preferably a substituted-aryl group having a carbon number of 13 or more and 30 or less.

Other specific examples of R include groups selected from:

an alkyl group having a carbon number of 10 or more, more preferably 12 or more; and 27 or less, more preferably 26 or less, further preferably 24 or less; preferably an aliphatic alkyl group; more preferably a linear aliphatic alkyl group; and further preferably a linear primary aliphatic alkyl group; and an alkenyl group having a carbon number of 10 or more, more preferably 12 or more; and preferably 27 or less, more preferably 26 or less, further preferably 24 or less; preferably an aliphatic alkenyl group; more preferably a linear aliphatic alkenyl group; further preferably a linear primary aliphatic alkenyl group.

In addition, other specific examples of R include an alkyl-substituted phenyl group having a carbon number of preferably 1 or more, and more preferably 2 or more; and preferably 10 or less, and further preferably 8 or less; a benzyl-substituted phenyl group; and a styrenated phenyl group. Specifically, these groups include a benzyl-substituted phenyl group with a carbon number of 13 or more and 27 or less, a styrenated phenyl group with a carbon number of 14 or more and 30 or less, an octyl phenyl group and a nonyl phenyl group.

In the general formulas (B1), (B2) and (B3), AO represents an alkyleneoxy group with a carbon number of 2 or more and 4 or less, preferably an alkyleneoxy group with a carbon number of 2 or 3. AO preferably includes an alkyleneoxy group with a carbon number of 2.

In the general formula (B1), p represents an average number of AO moles added, and from the viewpoint of the dispersibility, it is 1 or more, preferably 5 or more, more preferably 10 or more, further more preferably 20 or more, and further more preferably 50 or more; and from an economic viewpoint, it is 200 or less, preferably 150 or less and more preferably 100 or less.

In the general formulas (B2) and (B3), q and r are the same or different, and each represents an average number of AO moles added and is 0 or more. From the viewpoint of the dispersibility, q+r is 1 or more, preferably 2 or more, more preferably 5 or more, further more preferably 10 or more, further more preferably 20 or more, and further more preferably 50 or more; and from an economic viewpoint, it is 200 or less, preferably 150 or less, and more preferably 100 or less.

In the general formulas (B1) and (B3), M, $M^1$ and $M^2$ are the same or different, and each represents a counter ion such as a hydrogen ion, an alkali metal ion, an alkaline earth metal ion (½ atom) and an ammonium ion.

From the viewpoint of ease of manufacturing a compound, M, $M^1$ and $M^2$ are preferably an ammonium ion.

From the viewpoint of the offensive smell of a compound, M, $M^1$ and $M^2$ are preferably an alkali metal ion, more preferably an alkali metal ion selected from a sodium ion and a potassium ion.

In the general formula (B2), $X^1$ and $X^2$ are the same or different, and each represents a hydrogen atom or a hydrocarbon group with a carbon number of 1 or more and 4 or less. The hydrocarbon group is preferably an alkyl group. $X^1$ and $X^2$ are each preferably a hydrogen atom.

The present invention covers an invention wherein compounds defined by replacing the structures of the general formulas (B1), (B2) and (B3) with these preferred matters are used as the component (B).

From the viewpoint of the fluidity improvement, the dispersant composition for a hydraulic composition of the present invention contains the component (B) in solid content in an amount of preferably 1 mass % or more, more preferably 3 mass % or more, further preferably 5 mass % or more, further more preferably 10 mass % or more, further more preferably 15 mass % or more, and further more preferably 25 mass % or more; and preferably 95 mass % or less, more preferably 75 mass % or less, further preferably 50 mass % or less, and further more preferably 45 mass % or less.

From the viewpoint of obtaining a hydraulic composition with excellent fluidity, the dispersant composition for a hydraulic composition of the present invention has a molar ratio of the total amount of the component (B) to the naphthalene ring-containing monomer unit in the component (A) of 0.4% or more and 30% or less. From the same viewpoint, the molar ratio is preferably 1% or more, more preferably 3% or more, further preferably 5% or more, and further more preferably 7% or more; and preferably 16% or less, more preferably 13% or less, and further preferably 11% or less. This molar ratio is calculated based on the total amount of the naphthalene ring-containing monomer unit in the component (A) and the total amount of the component (B). Specifically, it is calculated by the following equation.

Molar ratio (%)=[[total amount (mol) of component (B)]/[total amount (mol) of naphthalene ring-containing monomer units in component (A)]]×100

Further, in the case that two or more components (A) and components (B) are used, total values of their moles are used for calculation.

In the case that the component (A) is a formaldehyde naphthalenesulfonate condensate or a salt thereof, a naphthalene ring-containing monomer unit is a monomer unit formed by dehydration-condensation reaction of a naphthalenesulfonate or a salt thereof with formaldehyde. In the case that the component (A) is a sodium salt of a formaldehyde naphthalenesulfonate condensate, the total amount (mol) of naphthalene ring-containing monomer units in the compound is calculated by the following equation. In the equation, a sodium salt of a formaldehyde naphthalenesulfonate condensate is expressed as NSF.

Total amount (mol) of naphthalene ring-containing monomer units in NSF=[total amount of mass of naphthalene ring-containing monomer units in NSF]/[molecular weight of naphthalene ring-containing monomer unit in NSF]

In the case that the component (A) is a condensate of a naphthalenesulfonate or a salt thereof and formaldehyde, the total amount of mass of naphthalene ring-containing monomer units in the component (A) is a total mass of the compound.

Further, in the case that the component (A) is a condensate of a naphthalenesulfonate or a salt thereof, formaldehyde, and other monomer free of naphthalene ring, the total amount of mass of naphthalene ring-containing monomer units in the component (A) is a mass obtained by subtracting, from the total mass of the compound, masses of monomer units derived from the other monomer free of naphthalene ring and formaldehyde.

The mass of monomer units derived from the other monomer free of naphthalene ring may be calculated from a fed amount at the time of synthesis, or may be calculated by use of a common analytical device such as a nuclear magnetic resonance spectroscope, which can determine a copolymerization mass ratio.

Further, in the case that the component (A) is a sodium salt of a formaldehyde naphthalenesulfonate condensate, the molecular weight of the naphthalene ring-containing monomer unit in the component (A) is determined as a numeral value obtained by subtracting water (18.0) or a by-product of condensation reaction from the sum of the molecular weight (230.2) of sodium naphthalenesulfonate and the molecular weight (30.0) of formaldehyde, that is 242.2.

Further, the molecular weight of the component (B) may be determined from the total sum of atomic weights forming a molecule, or may be calculated by use of software, for example, ChemBioDraw (manufactured by PerkinElmer).

In the dispersant composition for a hydraulic composition of the present invention, in the case that, for example, the component (A) is a sodium salt of a formaldehyde naphthalenesulfonate condensate and the component (B) is an ammonium salt of a polyoxyethylene alkylether sulfate, the molar ratio of the total amount of the component (B) to the naphthalene ring-containing monomer unit in the component (A) can be determined by: separating the component (A) from the component (B) by a common method such as a reprecipitation method or a liquid separation method; and measuring a mass ratio for calculation.

Further, the structures of the components (A) and (B) in the dispersant composition for a hydraulic composition may be analyzed by: separating the component (A) from the component (B) by a common method such as a reprecipitation method or a liquid separation method; and analyzing by use of a common analytical apparatus such as a nuclear magnetic resonance spectroscope or a liquid chromatograph.

For the dispersant composition for a hydraulic composition of the present invention, it is essentially preferred that a ratio between the naphthalene ring-containing monomer unit in the component (A) and the component (B) in the composition be determined by a molar ratio therebetween, but it may be determined by defining, for example, a mass ratio as described below.

From the viewpoint of the fluidity improvement, the dispersant composition for a hydraulic composition of the present invention has a mass ratio between the components (A) and (B), (A)/(B), of preferably 0.08 or more, more preferably 0.50 or more, further preferably 0.70 or more, and further more preferably 0.90 or more; and preferably 70 or less, more preferably 50 or less, further preferably 30 or less, further more preferably 15 or less, further more preferably 8.0 or less, further more preferably 5.0 or less, and further more preferably 3.0 or less.

<Other Components>

The dispersant composition for a hydraulic composition of the present invention may further contain (C) an antifoaming agent (hereinafter, referred to as component (C)).

As the component (C), exemplified are one or more antifoaming agents selected from a silicone-based antifoaming agent, a fatty acid ester-based antifoaming agent, an ether-based antifoaming agent, a polyalkylene oxide-based antifoaming agent, an alkyl phosphoric ester-based antifoaming agent and an acetylene glycol-based antifoaming agent.

As the component (C), preferred is one or more antifoaming agent selected from a silicone-based antifoaming agent, a fatty acid ester-based antifoaming agent and an ether-based antifoaming agent.

The silicone-based antifoaming agent is preferably dimethyl polysiloxane.

The fatty acid ester-based antifoaming agent is preferably a polyalkylene glycol fatty acid ester.

The ether-based antifoaming agent is preferably polyalkylene glycol alkyl ether.

The polyalkylene oxide-based antifoaming agent is preferably a block copolymer of ethylene oxide and propylene oxide.

The alkyl phosphoric ester-based antifoaming agent is preferably tributyl phosphate, isotributyl phosphate, or sodium octyl phosphate.

The acetylene glycol-based antifoaming agent is preferably 2,4,7,9-tetramethyl-5-decyne-4,7-diol or an alkyleneoxide adduct thereof.

The silicone antifoaming agent is preferably in an emulsion form compatible with water. Examples of the emulsion form compatible with water include commercial products such as KM-70, KM-73A (both available from Sin-Etsu Chemical Co., Ltd.), TSA series (Momentive Performance Materials Japan Inc.), FS anti-foam series (Dow Corning Toray Co., Ltd.), and Anti-foam E-20 (Kao Corporation).

Examples of the fatty acid ester-based antifoaming agent include commercial products of polyalkylene glycol fatty acid ester such as Rheodol TW-L120 (Kao Corporation), Nicofix and Foamlex (both from Nicca Chemical Co., Ltd.).

Examples of the ether-based antifoaming agent include commercial products of polyalkylene glycol alkyl ether such as Defoamer No. 1, Defoamer No. 5, Defoamer No. 8 (all available from Kao Corporation), SN defoamer 15-P, Foamaster PC (both available from San Nopco Limited) and Adeka Pluronic series (Adeka Corporation).

Examples of the polyalkylene oxide-based antifoaming agent include a commercial product of a polyethyleneoxide polypropylene oxide block copolymer such as a block copolymer of ethyleneoxide and propyleneoxide, for example PLURONIC™ products (BASF).

As a commercial product of the acetylene glycol-based antifoaming agent, exemplified are SURFYNOL(trademark) 400 series (Air Products and Chemicals, Inc.) and others.

As the component (C), a fatty acid ester-based antifoaming agent is preferred from the viewpoint of preventing strength reduction.

The dispersant composition for a hydraulic composition of the present invention contains the component (C) in solid content in an amount of preferably 0.001 mass % or more, more preferably 0.01 mass % or more, and further preferably 0.1 mass % or more; and preferably 10 mass % or less, more preferably 5 mass % or less and further preferably 1 mass % or less.

From the viewpoint of the foaming prevention and foam breaking, the dispersant composition for a hydraulic composition of the present invention has a mass ratio between the components (B) and (C), (C)/(B), of preferably 0.00001 or more, more preferably 0.00005 or more, and further preferably 0.0001 or more; and preferably 0.5 or less, more preferably 0.1 or less, and further preferably 0.05 or less.

In general, when a compound having good foaming property is added to a hydraulic composition such as concrete, it entrains foam into the composition and sometimes improves the fluidity like an AE water reducing agent described in JIS A-6204. Meanwhile, an antifoaming agent can generally break foam taken into a hydraulic composition such as concrete, so this reduces a void in a hardened product of the hydraulic composition, thereby preventing reduction of strength. Therefore, it is considered that a combined use of a compound with good foaming property like the compound (B) and an antifoaming agent is preferred from the viewpoint of preventing strength reduction, but not preferred from the viewpoint of improving the fluidity. However, in the present invention, even when an antifoaming agent is used, the strength reduction can be prevented while the fluidity of a hydraulic composition is kept, and therefore an effect different from the improvement of fluidity caused by foam can be obtained.

The dispersant composition for a hydraulic composition of the present invention may contain a component such as a conventional cement dispersant, a water-soluble polymer compound, an air entraining agent, a cement wetting agent, an expansive additive, a waterproofing agent, a retarder, a set accelerating agent, a viscous agent, a coagulant, a drying shrinkage reducing agent, a strength enhancement agent, a hardening accelerator, and an antiseptic agent (excluding those corresponding to the components (A) to (C)).

The dispersant composition for a hydraulic composition of the present invention may be in the form of either of a liquid and a solid. In the case that the dispersant composition for a hydraulic composition of the present invention is in the form of a liquid, it preferably contains water.

When the dispersant composition for a hydraulic composition is in the form of a liquid containing water, the content of the water in the composition is, from the viewpoint of workability at the time of preparing the hydraulic composition, preferably 10 mass % or more, more preferably 30 mass % or more, and further preferably 50 mass % or more; and from an economic viewpoint, preferably 90 mass % or less, and more preferably 60 mass % or less.

When the dispersant composition for a hydraulic composition is in the form of a liquid containing water, the content of component (A) in the composition is, from the viewpoint of improving the fluidity of the hydraulic composition, preferably 7 mass % or more, more preferably 10 mass % or more, and further preferably 15 mass % or more; and preferably 89 mass % or less, more preferably 84 mass % or less, and further preferably 79 mass % or less.

When the dispersant composition for a hydraulic composition is in the form of a liquid containing water, the content of the component (B) in the composition is, from the viewpoint of improving the fluidity of the hydraulic composition, preferably 1 mass % or more, more preferably 6 mass % or more, and further preferably 11 mass % or more; and preferably 83 mass % or less, more preferably 60 mass % or less, and further preferably 45 mass % or less.

When the dispersant composition for a hydraulic composition is in the form of a liquid containing water, the total content of the components (A) and (B) in the composition is, from the viewpoint of improving the fluidity of the hydraulic composition, preferably 10 mass % or more, and more preferably 30 mass % or more; and preferably 90 mass % or less, more preferably 70 mass % less, and further preferably 50 mass % or less.

As the dispersant composition for a hydraulic composition of the present invention, exemplified is a dispersant composition for a hydraulic composition containing (A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 7]

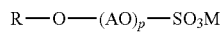 (B1)

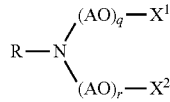 (B2)

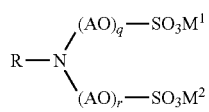 (B3)

wherein:
R is a hydrocarbon group having a carbon number of 10 or more and 30 or less;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

[Dispersant Composition for an Inorganic Powder]

Specific examples and preferred embodiments of components (A) and (B) used in a dispersant composition for an inorganic powder of the present invention are the same as those mentioned for the dispersant composition for a hydraulic composition of the present invention.

Further, in the dispersant composition for an inorganic powder of the present invention, a molar ratio of a total amount of the component (B) to the naphthalene ring-containing monomer unit in the component (A) is 0.4% or more and 30% or less. Preferred range of this molar ratio is the same as that of the dispersant composition for a hydraulic composition of the present invention.

Specific examples and preferred embodiments of component (C) used in the dispersant composition for an inorganic powder of the present invention are the same as those mentioned for the dispersant composition for a hydraulic composition of the present invention.

The inorganic powder is not particularly limited, but examples thereof are listed below. Those used for hydraulic powders among inorganic powders are the dispersant composition for a hydraulic composition of the present invention.

(1) hydraulic powders such as cement and gypsum
(2) powders having a pozzolanic action such as fly ash, silica fume, volcanic ash, and silicate clay
(3) potential hydraulic powders such as coal ash, blast-furnace slag and diatomaceous earth
(4) silicates such as kaolin, aluminum silicate, clay, talc, mica, calcium silicate, sericite, and bentonite
(5) carbonates such as calcium carbonate, magnesium carbonate, barium carbonate, and basic lead carbonate
(6) sulfates such as calcium sulfate and barium sulfate
(7) chromates such as strontium chromate and pigment yellow
(8) molybdates such as zinc molybdate, calcium-zinc molybdate, and magnesium molybdate
(9) metallic oxides such as alumina, antimony oxide, titanium oxide, cobalt oxide, triiron tetraoxide, diiron trioxide, trilead tetraoxide, lead monoxide, chrome oxide green, tungsten trioxide, and yttrium oxide
(10) metallic hydroxides such as aluminum hydroxide, magnesium hydroxide, calcium hydroxide, iron hydroxide, and metatitanic acid
(11) metallic carbides such as silicon carbide, tungsten carbide, boron carbide and titanium carbide
(12) other inorganic powders not classified in the above (1) to (11), such as aluminum nitride, silicon nitride, boron nitride, zirconia, barium titanate, satin white, carbon black, graphite, chrome yellow, mercury sulfide, ultramarine, Paris blue, titanium yellow, chrome vermilion, lithopone, copper acetoarsenite, nickel, silver, palladium, and lead zirconate titanate The dispersant composition for an inorganic powder of the present invention may be used for an inorganic powder slurry. The inorganic powder slurry is a slurry, which contains an inorganic powder, water, component (A) and component (B), wherein a molar ratio of a total amount of the component (B) to a naphthalene ring-containing monomer unit in the component (A) is 0.4% or more and 30% or less. When the inorganic powder is a hydraulic powder, a slurry is a hydraulic composition of the present invention.

Specific examples and preferred embodiments of the components (A) and (B) used for the slurry of the present invention are respectively the same as those mentioned for the dispersant composition for a hydraulic composition of the present invention. Further, in the slurry of the present invention, a molar ratio of a total amount of the component (B) to a naphthalene ring-containing monomer unit in the component (A) is 0.4% or more and 30% or less. Preferred range of this molar ratio is the same as that for the dispersant composition for a hydraulic composition of the present invention.

As the inorganic powder slurry, exemplified is a slurry using, for example, blast furnace slag as an inorganic powder (hereinafter, referred to as blast furnace slag slurry). The blast furnace slag slurry preferably contains the dispersant composition for an inorganic powder of the present invention in solid content in an amount of from 0.01 parts by mass to 5.0 parts by mass relative to 100 parts by mass of blast furnace slag. The blast furnace slag slurry contains water in an amount of preferably 40 parts by mass or more, more preferably 45 parts by mass or more; and preferably 250 parts by mass, and more preferably 230 parts by mass or less relative to 100 parts by mass of blast furnace slag. Further, the blast furnace slag slurry preferably contains component (C). The blast furnace slag slurry has a mass ratio of components (B) and (C), (C)/(B), of preferably 0.00001 or more, more preferably 0.00005 or more, and further preferably 0.0001 or more; and preferably 0.5 or less, more preferably 0.1 or less, and further preferably 0.05 or less.

[Hydraulic Composition]

The present invention provides a hydraulic composition, which contains a hydraulic powder, water, component (A) and component (B), wherein a molar ratio of a total amount of the component (B) to a naphthalene ring-containing monomer unit in the component (A) is 0.4% or more and 30% or less.

The hydraulic powder used for the hydraulic composition of the present invention is a powder having a property, which enables the powder to be hardened by hydration, and examples thereof include cement and gypsum. The powder is preferably cement such as ordinary portland cement, belite cement, moderate heat cement, early strength cement, ultra early strength cement, and sulfate resisting cement. Further, it may be blast furnace slag cement, fly ash cement, silica fume cement or the like, which contains, in addition to cement, a powder having a pozzolanic action and/or potential hydraulicity such as blast furnace slag, fly ash and silica fume, or stone powder (calcium carbonate powder).

The hydraulic composition of the present invention has a water/hydraulic powder ratio (mass percentage (mass %) of water and hydraulic powder in a slurry, usually abbreviated as W/P, but when the powder is cement, abbreviated as W/C) of 10 mass % or more or 15 mass % or more; and 500 mass % or less, 400 mass % or less, 200 mass % or less, 100 mass % or less, 70 mass % or less, 60 mass % or less, or 50 mass % or less.

The water/hydraulic powder ratio is, in terms of exhibiting the fluidity even with a small amount of water blended, preferably 10 mass % or more, and more preferably 15 mass % or more; and in terms of dealing with applications such as cement milk for foundation improvement, which do not require a high strength, preferably 500 mass % or less, more preferably 400 mass % or less, further preferably 200 mass % or less, and further more preferably 100 mass % or less.

The water/hydraulic powder ratio is, in terms of exhibiting the fluidity even with a small amount of water blended, preferably 10 mass % or more, and more preferably 15 mass % or more; and in terms of corresponding to uses such as concrete products, which require a relatively high strength, preferably 70 mass % or less, more preferably 60 mass % or less, and further preferably 50 mass % or less.

Specific examples and preferred embodiments of the components (A) and (B) used in the hydraulic composition of the present invention are the same as those mentioned for the dispersant composition for a hydraulic composition of the present invention.

Further, in the hydraulic composition of the present invention, a molar ratio of a total amount of the component (B) to a naphthalene ring-containing monomer unit in the component (A) is 0.4% or more and 30% or less. Preferred range of this molar ratio is the same as that for the dispersant composition for a hydraulic composition of the present invention.

The hydraulic composition of the present invention contains the component (A) in an amount of preferably 0.001 parts by mass or more, more preferably 0.01 parts by mass or more, further preferably 0.1 parts by mass or more, further more preferably 0.15 parts by mass or more, and further more preferably 0.22 parts by mass or more; and preferably 10 parts by mass or less, more preferably 5 parts by mass or less, further preferably 2 parts by mass or less, further more preferably 1.5 parts by mass or less, further more preferably 1.0 part by mass or less, further more preferably 0.50 parts by mass or less, further more preferably 0.40 parts by mass or less, and further more preferably 0.30 parts by mass or less relative to 100 parts by mass of the hydraulic powder.

The hydraulic composition of the present invention contains the component (B) in an amount of preferably 0.0001 parts by mass or more, more preferably 0.001 parts by mass or more, further preferably 0.01 parts by mass or more, further more preferably 0.04 parts by mass or more, further more preferably 0.10 parts by mass or more, and further more preferably 0.20 parts by mass or more; and preferably 10 parts by mass or less, more preferably 5 parts by mass or less, further preferably 1 part by mass or less, further more preferably 0.40 parts by mass or less, further more preferably 0.35 parts by mass or less, and further more preferably 0.28 parts by mass or less relative to 100 parts by mass of the hydraulic powder.

The hydraulic composition of the present invention contains the components (A) and (B) in total in an amount of preferably 0.001 parts by mass or more, more preferably 0.01 parts by mass or more, further preferably 0.1 parts by mass or more, and further more preferably 0.2 parts by mass or more; and preferably 20 parts by mass or less, more preferably 10 parts by mass or less, further preferably 3 parts by mass or less, and further more preferably 0.9 parts by mass or less, relative to 100 parts by mass of the hydraulic powder.

The hydraulic composition of the present invention may contain an antifoaming agent as the component (C). Specific examples and preferred embodiments of the antifoaming are the same as those described for the dispersant composition for a hydraulic composition of the present invention. When the component (C) is used, the hydraulic composition of the present invention contains the component (C) in an amount of preferably 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

The hydraulic composition of the present invention preferably contains an aggregate. Examples of the aggregate include aggregates selected from fine aggregates and coarse aggregates. As the fine aggregate, those defined in No. 2311 of JIS A0203-2014 are exemplified. Examples of the fine aggregate include river sand, land sand, pit sand, sea sand, lime sand, silica sand and crushed sand thereof, blast furnace slag fine aggregate, ferronickel slag fine aggregate, light-weight fine aggregate (artificial and natural), and recycled fine aggregate. Further, as the coarse aggregate, those defined in No. 2312 of JIS A0203-2014 are exemplified. Examples of the coarse aggregate include river gravel, land gravel, pit gravel, sea gravel, lime gravel, crushed stone thereof, blast furnace slag coarse aggregate, ferronickel slag coarse aggregate, light-weight coarse aggregate (artificial and natural), and recycled coarse aggregate. Different types of fine aggregate and coarse aggregate may be mixed and used, or a single type thereof may be used.

In the case that the hydraulic composition is concrete, the bulk volume pertaining to the amount of coarse aggregate to be used is preferably 50% or more, more preferably 55% or more, and further preferably 60% or more; and preferably 100% or less, more preferably 90% or less, and further preferably 80% or less, from the viewpoint of exhibiting the strength of the hydraulic composition, reducing the amount of the hydraulic powder to be used such as cement, and improving the filling property into forms and the like. The bulk volume is a ratio of volume (including voids) of coarse aggregate in 1 m³ of concrete.

Further, in the case that the hydraulic composition is concrete, the amount of fine aggregate to be used is preferably 500 kg/m³ or more, more preferably 600 kg/m³ or more, and further preferably 700 kg/m³; and preferably 1000 kg/m³ or less, and more preferably 900 kg/m³, from the viewpoint of improving the filling property into forms and the like.

In the case that the hydraulic composition is mortar, the amount of fine aggregate to be used is preferably 800 kg/m³ or more, more preferably 900 kg/m³ or more, and further preferably 1000 kg/m³ or more; and preferably 2000 kg/m³ or less, more preferably 1800 kg/m³ or less, and further preferably 1700 kg/m³ or less.

As the hydraulic composition, concrete and the like are exemplified. Especially, concrete using cement is preferred. The hydraulic composition of the present invention is useful in any field for self-leveling, refractories, plaster, light-weight or heavy-weight concrete, AE, repairing, prepacking, tremies, foundation improvement, grout and cold weather.

The hydraulic composition of the present invention may further contain other component. Examples thereof include an AE agent, a retarder, a foaming agent, a viscous agent, a blowing agent, a waterproofing agent, and a fluidizing agent.

As the hydraulic composition of the present invention, exemplified is a hydraulic composition, which contains a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 8]

$$R-O-(AO)_p-SO_3M \quad (B1)$$

(B2)

(B3)

wherein:
R is a hydrocarbon group having a carbon number of 10 or more and 30 or less;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, M¹ and M² are the same or different and each represents a counter ion; and
X¹ and X² are the same or different, and each represents a hydrogen atom or a hydrocarbon group having a carbon number of 1 or more and 4 or less.

[Method for Manufacturing a Dispersant Composition for a Hydraulic Composition]

The present invention provides a method for manufacturing a dispersant composition for a hydraulic composition containing components (A) and (B), wherein the method includes mixing the components (A) and (B) so that a molar ratio of a total amount of the component (B) to the naphthalene ring-containing monomer unit in the component (A) is 0.4% or more and 30% or less.

Specific examples and preferred embodiments of the components (A) and (B) used for the method of the present invention for manufacturing a dispersant composition for a hydraulic composition are the same as those described for the dispersant composition for a hydraulic composition of the present invention. Further, a dispersant composition for a hydraulic composition containing components (A), (B) and (C) can be manufactured by mixing the components (A), (B) and (C). Specific examples and preferred embodiments of the component (C) are the same as those described for the dispersant composition for a hydraulic composition of the present invention.

Further, the matters described for the dispersant composition for a hydraulic composition of the present invention are appropriately applicable to the method for manufacturing a dispersant composition for a hydraulic composition of the present invention.

Further, in the method for manufacturing a dispersant composition for a hydraulic composition of the present invention, the components (A) and (B) are mixed so that a molar ratio of a total amount of the component (B) to the naphthalene ring-containing monomer unit in the component (A) is 0.4% or more and 30% or less. Preferred range of this molar ratio is the same as that for the dispersant composition for a hydraulic composition of the present invention.

The method of the present invention for manufacturing a dispersant composition for a hydraulic composition is suitable as a method for manufacturing a dispersant composition for a hydraulic composition of the present invention.

As the method of the present invention for manufacturing a dispersant composition for a hydraulic composition, exemplified is a method for manufacturing a dispersant composition for a hydraulic composition, which contains component (A), component (B) and water. In this case, mixing with the components (A) and (B) and water may be conducted by any method as long as the performance is not reduced. Usable are, for example, a method of mixing an aqueous solution of the component (A) heated to a freezing point or higher of the component (B) with the component (B) by a stirrer; and a method of dissolving the components (A) and (B) in water, respectively, and mixing an aqueous solution of the component (A) with an aqueous solution of the component (B).

As the method for manufacturing a dispersant composition for a hydraulic composition of the present invention, exemplified is a method for manufacturing a dispersant composition for a hydraulic composition, which contains (A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein the method includes mixing (A) and (B) so that a molar ratio of a total amount of (B) to the naphthalene ring-containing monomer unit in (A) is 0.4% or more and 30% or less,

[Chemical Formula 9]

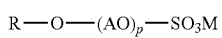
(B1)

$R\!-\!O\!-\!(AO)_p\!-\!SO_3M$

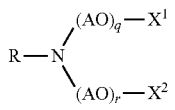
(B2)

$R\!-\!N\!\!\begin{array}{c}(AO)_q\!-\!X^1\\ (AO)_r\!-\!X^2\end{array}$

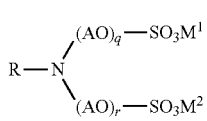
(B3)

$R\!-\!N\!\!\begin{array}{c}(AO)_q\!-\!SO_3M^1\\ (AO)_r\!-\!SO_3M^2\end{array}$ wherein:
R is a hydrocarbon group having a carbon number of 10 or more and 30 or less;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

[Method for Manufacturing a Hydraulic Composition]

The present invention provides a method for manufacturing a hydraulic composition, which includes mixing a hydraulic powder, water, component (A) and component (B), wherein the component (B) is mixed so that a molar ratio of a total amount of the component (B) to a naphthalene ring-containing monomer unit in the component (A) is 0.4% or more and 30% or less. In the present invention, the components (A) and (B) may be mixed separately with the hydraulic powder to manufacture a hydraulic composition, but it is preferred that the components (A) and (B) be mixed in advance and then, mixed with the hydraulic powder. In manufacturing a hydraulic composition, use of a dispersant composition for a hydraulic composition of the present invention is more preferred.

Specific examples and preferred embodiments of the components (A) and (B) used for the method for manufacturing a hydraulic composition of the present invention are the same as those described for the dispersant composition for a hydraulic composition of the present invention.

Also, specific examples and preferred embodiments for the hydraulic powder used for the method for manufacturing a hydraulic composition of the present invention are the same as those described for the hydraulic composition of the present invention.

Further, a dispersant composition for a hydraulic composition of the present invention containing a hydraulic powder, water, component (A), component (B) and component (C) can be manufactured by mixing the hydraulic powder, water, the component (A), the component (B) and the component (C). Specific examples and preferred embodiments of the component (C) are the same as those described for the dispersant composition for a hydraulic composition of the present invention.

Also, the matters described for the dispersant composition for a hydraulic composition and the hydraulic composition of the present invention are appropriately applicable to the method for manufacturing a hydraulic composition of the present invention.

Further, in the method for manufacturing a hydraulic composition of the present invention, the component (B) is mixed so that a molar ratio of a total amount of the component (B) to a naphthalene ring-containing monomer unit in the component (A) is 0.4% or more and 30% or less. Preferred range of this molar ratio is the same as that for the dispersant composition for a hydraulic composition of the present invention.

In the method for manufacturing a hydraulic composition of the present invention, the component (A) is mixed in an amount of preferably 0.01 parts by mass or more, more preferably 0.05 parts by mass or more, further preferably 0.1 parts by mass or more, further more preferably 0.15 parts by mass or more, and further more preferably 0.22 parts by mass; and preferably 4 parts by mass or less, more preferably 3 parts by mass or less, further preferably 1 part by mass or less, further more preferably 0.50 parts by mass or less, further more preferably 0.40 parts by mass or less, and further more preferably 0.30 parts by mass or less, relative to 100 parts by mass of the hydraulic powder.

In the method for manufacturing a hydraulic composition of the present invention, the component (B) is mixed in an amount of preferably 0.001 parts by mass or more, more preferably 0.005 parts by mass or more, further preferably 0.01 parts by mass or more, further more preferably 0.04 parts by mass or more, further more preferably 0.10 parts by mass or more, further more preferably 0.04 parts by mass or more, further more preferably 0.10 parts by mass or more, and further more preferably 0.20 parts by mass or more; and preferably 2 parts by mass or less, more preferably 1.5 parts by mass or less, further preferably 1 part by mass or less, further more preferably 0.40 parts by mass or less, further more preferably 0.35 parts by mass or less, and further more preferably 0.28 parts by mass or less, relative to 100 parts by mass of the hydraulic powder.

In the method for manufacturing a hydraulic composition of the present invention, the components (A) and (B) are mixed in total in an amount of preferably 0.01 parts by mass or more, more preferably 0.05 parts by mass or more, further preferably 0.1 parts by mass or more, and further more preferably 0.2 parts by mass or more; and preferably 4 parts by mass or more, more preferably 3 parts by mass or more, further preferably 2 parts by mass or more, and further more preferably 0.9 parts by mass or more, relative to 100 parts by mass of the hydraulic powder.

In the method for manufacturing a hydraulic composition of the present invention, an antifoaming agent as the component (C) may further be mixed. Specific examples and preferred embodiments of the antifoaming agent are the same as those described for the dispersant composition for a hydraulic composition of the present invention. When the component (C) is used in the method for manufacturing a hydraulic composition of the present invention, the component (C) is mixed in an amount of preferably 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

In the method for manufacturing a hydraulic composition of the present invention, from the viewpoint of smoothly mixing the components (A) and (B) with a hydraulic powder such as cement, it is preferred that the components (A) and (B) be mixed with water in advance, and then mixed with the hydraulic powder. The dispersant composition for a hydraulic composition of the present invention, which contains water, can be used.

Further, in the method for manufacturing a hydraulic composition of the present invention, a method for mixing a hydraulic powder such as cement with the dispersant composition for a hydraulic composition of the present invention is preferred. The dispersant composition for a hydraulic composition of the present invention may be in the form of powder or liquid. For the dispersant composition for a hydraulic composition of the present invention, it is preferred that the components (A) and (B), and further the component (C) be added in above-described amounts relative to the hydraulic powder. Specifically, in terms of the mass parts of solid contents of the dispersant composition for a hydraulic composition of the present invention, they are mixed in an amount of preferably 0.001 parts by mass or more, more preferably 0.005 parts by mass or more, further preferably 0.01 parts by mass or more, and further more preferably 0.05 parts by mass or more; and preferably 20 parts by mass or less, more preferably 10 parts by mass or less, further preferably 3 parts by mass or less, and further more preferably 0.9 parts by mass or less.

The hydraulic powder, water, the component (A) and the component (B) are mixed by a mixer such as a mortar mixer and a biaxial pug mill. In addition, the mixing is performed for preferably 1 minute or more, and more preferably 2 minutes or more; and preferably 5 minutes or less and more preferably 3 minutes or less. In preparing the hydraulic composition, the materials or agents, and the amounts thereof explained for the hydraulic composition are applicable.

The present invention provides a method for manufacturing a hardened product, which has:

preparing a hydraulic composition by mixing a hydraulic powder, water, component (A) and component (B), wherein the mixing of the component (B) is performed so that a molar ratio of a total amount of the component (B) to a naphthalene ring-containing monomer unit in the component (A) is 0.4% or more and 30% or less;

filling the prepared hydraulic composition into a form and curing and hardening; and removing the hardened hydraulic composition from the form.

The matters described for the dispersant composition for a hydraulic composition, the hydraulic composition, the method for manufacturing a dispersant composition for a hydraulic composition, and the method for manufacturing a hydraulic composition of the present invention are also applicable to this method for manufacturing a hardened product.

Examples of the hardened product of the hydraulic composition using a form, which is a concrete product, include products for civil engineering such as various block products for revetment, box culvert products, segment products used for tunnel construction, and girder products for bridge piers; and products for architecture such as curtain wall products and building component products used for pillars, beams and floor plates.

As the method for manufacturing a hydraulic composition of the present invention, exemplified is a method for manufacturing a hydraulic composition containing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), wherein the method includes mixing (A) and (B) so that a molar ratio of a total amount of (B) to a naphthalene ring-containing monomer unit in (A) is 0.4% or more and 30% or less,

[Chemical Formula 10]

(B1)

(B2)

(B3)

wherein:
R is a hydrocarbon group having a carbon number of 10 or more and 30 or less;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

[Method for Improving Dispersing Performance]

The present invention provides, in preparing a hydraulic composition by mixing a hydraulic powder, water and component (A), a method for improving dispersing performance of the component (A) for the hydraulic powder, wherein the method includes adding component (B) so that a molar ratio of a total amount of the component (B) to a naphthalene ring-containing monomer unit in the component (A) is 0.4% or more and 30% or less. The component (A) is known as a dispersant for a hydraulic powder, and its dispersing performance improves the fluidity of a hydraulic composition. Then, the component (B) is used in combination at the above molar ratio, and this improves the fluidity of the hydraulic composition compared to a case where the component (A) is used alone. That is, addition of the component (B) at the molar ratio improves the dispersing performance of the component (A) for the hydraulic powder.

Specific examples and preferred embodiments of the components (A) and (B) used in the method for improving dispersing performance of the present invention are the same as those described for the dispersant composition for a hydraulic composition of the present invention.

Further, specific examples and preferred embodiments of the hydraulic powder used in the method for improving dispersing performance of the present invention are the same as those described for the hydraulic composition of the present invention.

Further, the matters described for the dispersant composition for a hydraulic composition, the hydraulic composition, the method for manufacturing a dispersant composition for a hydraulic composition, and the method for manufacturing a hydraulic composition of the present invention are appropriately applicable to the method for improving dispersing performance of the present invention.

Further, in the method for improving dispersing performance of the present invention, the component (B) is added so that a molar ratio of a total amount of the component (B) to a naphthalene ring-containing monomer unit in the component (A) is 0.4% or more and 30% or less. Preferred range of this molar ratio is the same as that for the dispersant composition for a hydraulic composition of the present invention.

As the method for improving dispersing performance of the present invention, exemplified is a method for, in preparing a hydraulic composition by mixing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), improving dispersing performance of (A) for the hydraulic powder, wherein the method includes adding (B) the one or two or more compounds selected from a compound represented by the following general formula (B1), a compound represented by the following general formula (B2) and a compound represented by the following general formula (B3) so that a molar ratio of a total amount of (B) to the naphthalene ring-containing monomer unit in (A) is 0.4% or more and 30% or less,

[Chemical Formula 11]

     (B1)

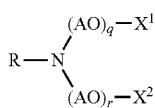     (B2)

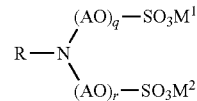     (B3)

wherein:
R is a hydrocarbon group having a carbon number of 10 or more and 30 or less;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

[Use]

In addition to the above, the present invention discloses use, as a dispersant for a hydraulic composition, of a composition containing components (A) and (B), wherein a molar ratio of a total amount of the component (B) to a naphthalene ring-containing monomer unit in the component (A) is 0.4% or more and 30% or less.

Further, the present invention discloses use, as a hydraulic composition, of a composition containing a hydraulic powder, water, component (A) and component (B), wherein a molar ratio of a total amount of the component (B) to a naphthalene ring-containing monomer unit in the component (A) is 0.4% or more and 30% or less.

The matters described for the dispersant composition for a hydraulic composition, the dispersant composition for an inorganic powder, the hydraulic composition, the method for manufacturing a dispersant composition for a hydraulic composition, the method for manufacturing a hydraulic composition, and the method for improving dispersing performance of the present invention can be appropriately applied to these uses.

Further, the present invention discloses a composition for use in a dispersant composition for a hydraulic composition, wherein the composition contains components (A) and (B), and a molar ratio of a total amount of the component (B) to a naphthalene ring-containing monomer unit in the component (A) is 0.4% or more and 30% or less.

Further, the present invention discloses a composition for use in a hydraulic composition, wherein the composition contains a hydraulic powder, water, component (A) and component (B), and a molar ratio of a total amount of the component (B) to a naphthalene ring-containing monomer unit in the component (A) is 0.4% or more and 30% or less.

The matters described for the dispersant composition for a hydraulic composition, the dispersant composition for an inorganic powder, the hydraulic composition, the method for manufacturing a dispersant composition for a hydraulic composition, the method for manufacturing a hydraulic composition, and the method for improving dispersing performance of the present invention can be appropriately applied to these compositions.

Embodiments of the Present Invention

Hereinafter, embodiments of the present invention are exemplified. The matters described for the dispersant composition for a hydraulic composition, the hydraulic composition, the method for manufacturing a dispersant composition for a hydraulic composition, the method for manufacturing a hydraulic composition, and the method for improving dispersing performance according to the present invention can be appropriately applied to these embodiments.

<1>

A dispersant composition for a hydraulic composition, containing (A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in is 0.4% or more and 30% or less,

[Chemical Formula 12]

(B1)

(B2)

(B3)

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

<2>

The dispersant composition for a hydraulic composition described in the above <1>, wherein the component (A) is a formaldehyde naphthalenesulfonate condensate or a salt thereof.

<3>

The dispersant composition for a hydraulic composition described in the above <2>, wherein the component (A) has a weight average molecular weight of preferably 200,000 or less, more preferably 100,000 or less, further preferably 80,000 or less, further more preferably 50,000 or less, and further more preferably 20,000 or less.

<4>

The dispersant composition for a hydraulic composition described in the above <2> or <3>, wherein the component (A) has a weight average molecular weight of preferably 1,000 or more, more preferably 3,000 or more, further preferably 4,000 or more, and further more preferably 5,000 or more.

<5>

The dispersant composition for a hydraulic composition described in any one of the above <1> to <4>, wherein Rs in the general formulas (B1), (B2) and (B3) of the component (B) are the same or different, and each is a carbon atom-containing group, preferably a hydrocarbon group, and is a group providing an HLB of a compound in the form of R—H of 2.25 or less, preferably 1.30 or less, more preferably 0.35 or less, further more preferably −0.6 or less, and preferably −5.83 or more, more preferably −5.35 or more, and further more preferably −4.40 or more.

<6>

The dispersant composition for a hydraulic composition described in any one of the above <1> to <5>, wherein Rs in the general formulas (B1), (B2) and (B3) of the component (B) are the same or different, and each is a group selected from a hydrocarbon group and a substituent-containing hydrocarbon group, preferably a hydrocarbon group selected from an alkyl group, an alkenyl group, an aralkyl group, an aryl group and an aryl group with a substituent (hereinafter, referred to as a substituted aryl group), and more preferably a hydrocarbon group selected from an alkyl group, an alkenyl group and a substituted aryl group.

<7>

The dispersant composition for a hydraulic composition described in any one of the above <1> to <6>, wherein the carbon numbers of Rs in the general formulas (B1), (B2) and (B3) of the component (B) are the same or different, and each is selected from 10 or more, further 12 or more, and 30 or less, further 27 or less, further, 26 or less, and further 24 or less.

<8>

The dispersant composition for a hydraulic composition described in any one of the above <1> to <7>, wherein Rs in the general formulas (B1), (B2) and (B3) of the component (B) are the same or different, each is an alkyl group or an alkenyl group, preferably an aliphatic alkyl group or an aliphatic alkenyl group, more preferably a linear aliphatic alkyl group or a linear aliphatic alkenyl group, and further preferably a linear primary aliphatic alkyl group or a linear primary aliphatic alkenyl group.

<9>

The dispersant composition for a hydraulic composition described in any one of the above <1> to <8>, wherein R in the general formula (B1) of the component (B) is a hydrocarbon group selected from a decyl group, a lauryl group, a myristyl group, a palmityl group, a stearyl group, a behenyl group, an isostearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; preferably a hydrocarbon group selected from a lauryl group, a myristyl group, palmityl group, a stearyl group, a behenyl group, an isostearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; more preferably a hydrocarbon group selected from a lauryl group, a myristyl group, palmityl group, a stearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group.

<10>

The dispersant composition for a hydraulic composition described in any one of the above <1> to <9>, wherein the component (B) is a compound wherein AOs in the general formulas (B1), (B2) and (B3) are the same or different and each is an alkyleneoxy group having 2 or 3 carbon atoms; or a compound wherein AOs in the general formulas (B1), (B2) and (B3) include an alkyleneoxy group having 2 carbon atoms.

<11>

The dispersant composition for a hydraulic composition described in any one of the above <1> to <10>, wherein the component (B) is one or two or more compounds selected from:

a compound represented by the general formula (B1), wherein p is 1 or more, preferably 20 or more, and more preferably 50 or more; and 200 or less, preferably 150 or less, and more preferably 100 or less;

a compound represented by the general formula (B2), wherein q and r are the same or different, each is 0 or more, and q+r is 1 or more, preferably 2 or more, more preferably 5 or more, further more preferably 10 or more, further more preferably 20 or more and further more preferably 50 or more; and 200 or less, preferably 150 or less and more preferably 100 or less; and a compound represented by the general formula (B3), wherein q and r are the same or different, each is 0 or more, and q+r is 1 or more, preferably 2 or more, more preferably 5 or more, further more preferably 10 or more, further more preferably 20 or more and further more preferably 50 or more; and 200 or less, preferably 150 or less and more preferably 100 or less.

<12>

The dispersant composition for a hydraulic composition described in any one of the above <1> to <11>, wherein M, $M^1$ and $M^2$ in the general formulas (B1) and (B3) are the same or different, and each is a counter ion selected from a hydrogen ion, an alkali metal ion, an alkaline earth metal ion (½ atom) and an ammonium ion.

<13>

The dispersant composition for a hydraulic composition described in any one of the above <1> to <12>, wherein a molar ratio of the total amount of the component (B) to the naphthalene ring-containing monomer unit in the component (A) is 0.4% or more, preferably 1% or more, more preferably 3% or more, further preferably 5% or more, and further more preferably 7% or more; and 30% or less, preferably 16% or less, more preferably 13% or less, and further preferably 11% or less.

<14>

The dispersant composition for a hydraulic composition described in any one of the above <1> to <13>, wherein a mass ratio between the components (A) and (B), (A)/(B), is preferably 0.08 or more, more preferably 0.50 or more, further preferably 0.70 or more, and further more preferably 0.90 or more; and preferably 70 or less, more preferably 50 or less, further preferably 30 or less, further more preferably 15 or less, further more preferably 8.0 or less, further more preferably 5.0 or less, and further more preferably 3.0 or less.

<15>

The dispersant composition for a hydraulic composition described in any one of the above <1> to <14>, wherein the component (A) is contained, in solid content, in an amount of preferably 5 mass % or more, more preferably 25 mass % or more, further preferably 50 mass % or more, and further more preferably 55 mass % or more; and preferably 99 mass % or less, more preferably 97 mass % or less, further preferably 95 mass % or less, further more preferably 90 mass % or less, further more preferably 85 mass % or less, and further more preferably 75 mass % or less.

<16>

The dispersant composition for a hydraulic composition described in any one of the above <1> to <15>, wherein the component (B) is contained, in solid content, in an amount of preferably 1 mass % or more, more preferably 3 mass % or more, further preferably 5 mass % or more, further more preferably 10 mass % or more, further more preferably 15 mass % or more, and further more preferably 25 mass % or more; and preferably 95 mass % or less, more preferably 75 mass % or less, further preferably 50 mass % or less, and further more preferably 45 mass % or less.

<17>

The dispersant composition for a hydraulic composition described in any one of the above <1> to <16>, wherein the dispersant composition for a hydraulic composition is a liquid containing water, and the water is contained in the composition in an amount of preferably 10 mass % or more, more preferably 30 mass % or more, and further preferably 50 mass % or more; and preferably 90 mass % or less, and more preferably 60 mass % or less.

<18>

The dispersant composition for a hydraulic composition described in any one of the above <1> to <17>, wherein the dispersant composition for a hydraulic composition is a liquid containing water and the component (A) is contained in the composition in an amount of preferably 7 mass % or more, more preferably 10 mass % or more, and further preferably 15 mass % or more; and preferably 89 mass % or less, more preferably 84 mass % or less, and further preferably 79 mass % or less.

<19>

The dispersant composition for a hydraulic composition described in any one of the above <1> to <18>, wherein the dispersant composition for a hydraulic composition is a liquid containing water and the component (B) is contained in the composition in an amount of preferably 1 mass % or more, more preferably 6 mass % or more, and further preferably 11 mass % or more; and preferably 83 mass % or less, more preferably 60 mass % or less, and further preferably 45 mass % or less.

<20>

The dispersant composition for a hydraulic composition described in any one of the above <1> to <19>, wherein the dispersant composition for a hydraulic composition is a liquid containing water and a total amount of the components (A) and (B) in the composition is preferably 10 mass % or more, and more preferably 30 mass % or more; and preferably 90 mass % or less, more preferably 70 mass % or less, and further preferably 50 mass % or less.

<21>

The dispersant composition for a hydraulic composition described in any one of the above <1> to <20>, further containing (C) an antifoaming agent, preferably a fatty acid ester-based antifoaming agent.

<22>

The dispersant composition for a hydraulic composition described in the above <21>, wherein the component (C) is contained in solid content in an amount of preferably 0.001 mass % or more, more preferably 0.01 mass % or more, and further preferably 0.1 mass % or more; and preferably 10 mass % or less, more preferably 5 mass % or less, and further preferably 1 mass % or less.

<23>

33

The dispersant composition for a hydraulic composition described in the above <21> or <22>, wherein a mass ratio between the components (B) and (C), (C)/(B), is preferably 0.00001 or more, more preferably 0.00005 or more, and further preferably 0.0001 or more; and preferably 0.5 or less, more preferably 0.1 or less, and further preferably 0.05 or less.

<24>

The dispersant composition for a hydraulic composition described in any one of the above <1> to <23>, wherein the dispersant composition excludes a composition for a hydraulic composition for centrifugal molding and a composition for a hydraulic composition for steam curing.

<25>

A hydraulic composition containing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 13]

$$R-O-(AO)_p-SO_3M \quad (B1)$$

$$R-N\begin{matrix}(AO)_q-X^1\\ \\(AO)_r-X^2\end{matrix} \quad (B2)$$

$$R-N\begin{matrix}(AO)_q-SO_3M^1\\ \\(AO)_r-SO_3M^2\end{matrix} \quad (B3)$$

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

<26>

The hydraulic composition described in the above <25>, wherein the component (A) is a formaldehyde naphthalenesulfonate condensate or a salt thereof.

<27>

The hydraulic composition described in the above <26>, wherein the component (A) has a weight average molecular weight of preferably 200,000 or less, more preferably 100,000 or less, further preferably 80,000 or less, further more preferably 50,000 or less, and further more preferably 20,000 or less.

34

<28>

The hydraulic composition described in the above <26> or <27>, wherein the component (A) has a weight average molecular weight of preferably 1,000 or more, more preferably 3,000 or more, further preferably 4,000 or more, and further more preferably 5,000 or more.

<29>

The hydraulic composition described in any one of the above <25> to <28>, wherein Rs in the general formulas (B1), (B2) and (B3) of the component (B) are the same or different, and each is a carbon atom-containing group, preferably a hydrocarbon group, and is a group providing an HLB of a compound in the form of R—H of 2.25 or less, preferably 1.30 or less, more preferably 0.35 or less, further more preferably −0.6 or less, and preferably −5.83 or more, more preferably −5.35 or more, and further more preferably −4.40 or more.

<30>

The hydraulic composition described in any one of the above <25> to <29>, wherein Rs in the general formulas (B1), (B2) and (B3) of the component (B) are the same or different, and each is a group selected from a hydrocarbon group and a substituent-containing hydrocarbon group, preferably a hydrocarbon group selected from an alkyl group, an alkenyl group, an aralkyl group, an aryl group and an aryl group with a substituent (hereinafter, referred to as a substituted aryl group), and more preferably a hydrocarbon group selected from an alkyl group, an alkenyl group and a substituted aryl group.

<31>

The hydraulic composition described in any one of the above <25> to <30>, wherein the carbon numbers of Rs in the general formulas (B1), (B2) and (B3) of the component (B) are the same or different, and each is selected from 10 or more, further 12 or more, and 30 or less, further 27 or less, further, 26 or less, and further 24 or less.

<32>

The hydraulic composition described in any one of the above <25> to <31>, wherein Rs in the general formulas (B1), (B2) and (B3) of the component (B) are the same or different, each is an alkyl group or an alkenyl group, preferably an aliphatic alkyl group or an aliphatic alkenyl group, more preferably a linear aliphatic alkyl group or a linear aliphatic alkenyl group, and further preferably a linear primary aliphatic alkyl group or a linear primary aliphatic alkenyl group.

<33>

The hydraulic composition described in any one of the above <25> to <32>, wherein R in the general formula (B1) of the component (B) is a hydrocarbon group selected from a decyl group, a lauryl group, a myristyl group, a palmityl group, a stearyl group, a behenyl group, an isostearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; preferably a hydrocarbon group selected from a lauryl group, a myristyl group, palmityl group, a stearyl group, a behenyl group, an isostearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group; more preferably a hydrocarbon group selected from a lauryl group, a myristyl group, palmityl group, a stearyl group, an oleyl group, a monobenzyl phenyl group, a dibenzyl phenyl group, a tribenzyl phenyl group, a monostyrenated phenyl group, a distyrenated phenyl group, a tristyrenated phenyl group, an octyl phenyl group and a nonyl phenyl group.

<34>
The hydraulic composition described in any one of the above <25> to <33>, wherein the component (B) is a compound in which AOs in the general formulas (B1), (B2) and (B3) are the same or different and each is a compound of an alkyleneoxy group having 2 or 3 carbon atoms; or a compound wherein AOs in the general formulas (B1), (B2) and (B3) include an alkyleneoxy group having 2 carbon atoms.

<35>
The hydraulic composition described in any one of the above <25> to <34>, wherein the component (B) is a compound in which p, q and r in the general formulas (B1), (B2) and (B3) are the same or different and each is 1 or more, preferably 20 or more, and more preferably 50 or more; and 200 or less, preferably 150 or less and more preferably 100 or less.

<36>
The hydraulic composition described in any one of the above <25> to <35>, wherein M, $M^1$ and $M^2$ in the general formulas (B1) and (B3) are the same or different and each is a hydrogen ion, an alkali metal ion, an alkaline earth metal ion (½ atom) and an ammonium ion.

<37>
The hydraulic composition described in any one of the above <25> to <36>, wherein a molar ratio of the total amount of the component (B) to the naphthalene ring-containing monomer unit in the component (A) is 0.4% or more, preferably 1% or more, more preferably 3% or more, further preferably 5% or more, and further more preferably 7% or more; and 30% or less, preferably 16% or less, more preferably 13% or less, and further preferably 11% or less.

<38>
The hydraulic composition described in any one of the above <25> to <37>, wherein the hydraulic powder is cement or gypsum.

<39>
The hydraulic composition described in any one of the above <25> to <38>, wherein a ratio of the water to the hydraulic powder is 10 mass % or more or 15 mass % or more; and 500 mass % or less, 400 mass % or less, 200 mass % or less, 100 mass % or less, 70 mass % or less, 60 mass % or less and 50 mass % or less.

<40>
The hydraulic composition described in any one of the above <25> to <39>, wherein the component (A) is contained in an amount of preferably 0.001 parts by mass or more, more preferably 0.01 parts by mass or more, further preferably 0.1 parts by mass or more, further more preferably 0.15 parts by mass or more, and further more preferably 0.22 parts by mass or more; and preferably 10 parts by mass or less, more preferably 5 parts by mass or less, further preferably 2 parts by mass or less, further more preferably 1.5 parts by mass or less, further more preferably 1.0 part by mass or less, further more preferably 0.50 parts by mass or less, further more preferably 0.40 parts by mass or less, and further more preferably 0.30 parts by mass or less, relative to 100 parts by mass of the hydraulic powder.

<41>
The hydraulic composition described in any one of the above <25> to <40>, wherein the component (B) is contained in an amount of preferably 0.0001 parts by mass or more, more preferably 0.001 parts by mass or more, further preferably 0.01 parts by mass or more, further more preferably 0.04 parts by mass or more, further more preferably 0.10 parts by mass or more, and further more preferably 0.20 parts by mass or more; and preferably 10 parts by mass or less, more preferably 5 parts by mass or less, further preferably 1 part by mass or less, further more preferably 0.40 parts by mass or less, further more preferably 0.35 parts by mass or less, and further more preferably 0.28 parts by mass or less, relative to 100 parts by mass of the hydraulic powder.

<42>
The hydraulic composition described in any one of the above <25> to <40>, wherein a total amount of the components (A) and (B) relative to 100 parts by mass of the hydraulic powder is preferably 0.001 parts by mass or more, more preferably 0.01 parts by mass or more, further preferably 0.1 parts by mass or more, and further more preferably 0.2 parts by mass or more; and preferably 20 parts by mass or less, more preferably 10 parts by mass or less, further preferably 3 parts by mass or less, and further more preferably 0.9 parts by mass or less.

<43>
The hydraulic composition described in any one of the above <25> to <42>, further containing (C) an antifoaming agent, preferably a fatty acid ester-based antifoaming agent.

<44>
The hydraulic composition described in the above <43>, wherein the component (C) is contained in an amount of 0.00005 parts by mass or more, more preferably 0.00025 parts by mass or more, and further preferably 0.0005 parts by mass or more; and preferably 0.1 parts by mass or less, more preferably 0.075 parts by mass or less, and further preferably 0.05 parts by mass or less, relative to 100 parts by mass of the hydraulic powder.

<45>
The hydraulic composition described in any one of the above <25> to <44>, wherein the hydraulic composition excludes a composition for centrifugal molding and a composition for steam curing.

<46>
A method for manufacturing a dispersant composition for a hydraulic composition, the dispersant composition containing (A) a polymer compound having a naphthalene ring-containing monomer unit; and (B) one or two or more compounds selected from a compound represented by the following general formula (B1), a compound represented by the following general formula (B2) and a compound represented by the following general formula (B3), the method including mixing (A) and (B) so that a molar ratio of a total amount of (B) to the naphthalene ring-containing monomer unit in (A) is 0.4% or more and 30% or less,

[Chemical Formula 14]

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

<47>
The method for manufacturing a dispersant composition for a hydraulic composition described in the above <46>, wherein the method excludes a method for manufacturing a dispersant composition for a hydraulic composition for centrifugal molding and a dispersant composition for a hydraulic composition for steam curing.

<48>
A method for manufacturing a hydraulic composition, the hydraulic composition containing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), the method including mixing (A) and (B) so that a molar ratio of a total amount of (B) to the naphthalene ring-containing monomer unit in (A) is 0.4% or more and 30% or less,

[Chemical Formula 15]

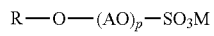  (B1)

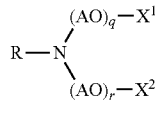  (B2)

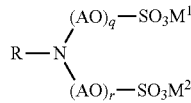  (B3)

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

<49>
The method for manufacturing a hydraulic composition described in the above <48>, wherein the method excludes a method for manufacturing a hydraulic composition for centrifugal molding and a hydraulic composition for steam curing.

<50>
In preparing a hydraulic composition by mixing a hydraulic powder, water, (A) a polymer compound having a naphthalene ring-containing monomer unit, and (B) one or two or more compounds selected from a compound represented by the following general formula (B1), a compound represented by the following general formula (B2) and a compound represented by the following general formula (B3), a method for improving dispersing performance of the component (A) for the hydraulic powder, the method including adding the component (B), the one or two or more compounds selected from a compound represented by the following general formula (B1), a compound represented by the following general formula (B2) and a compound represented by the following general formula (B3) so that a molar ratio of a total amount of the component (B) to the naphthalene ring-containing monomer unit in the component (A) is 0.4% or more and 30% or less,

[Chemical Formula 16]

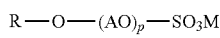  (B1)

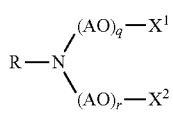  (B2)

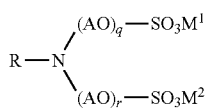  (B3)

wherein:
R is a hydrophobic group containing a carbon atom;
AO is an alkyleneoxy group having a carbon number of 2 or more and 4 or less;
p represents an average number of AO moles added and is 1 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

<51>
The method for improving dispersing performance described in the above <50>, wherein the hydraulic composition excludes a hydraulic composition for centrifugal molding and a hydraulic composition for steam curing.

<52>
Use of the dispersant composition for a hydraulic composition described in any one of the above <1> o<24> as a dispersant for a hydraulic composition or a dispersant for a hydraulic composition containing a hydraulic powder and water.

<53>

Use described in the above <52>, excluding use as a dispersant for a hydraulic composition for centrifugal molding and a dispersant for a hydraulic composition for steam curing.

<54>

The dispersant composition for a hydraulic composition described in any one of the above <1> to <24>, wherein the dispersant composition is used for a dispersant for a hydraulic composition, and further a dispersant for a hydraulic composition containing a hydraulic powder and water.

<55>

Use described in the above <54>, wherein a dispersant for a hydraulic composition for centrifugal molding and a dispersant for a hydraulic composition for steam curing are excluded.

<56>

Use of the composition described in any one of the above <25> to <45> as a hydraulic composition.

<57>

Use described in the above <56>, wherein a hydraulic composition for centrifugal molding and a hydraulic composition for steam curing are excluded.

<58>

The composition described in any one of the above <25> to <45> for use in a hydraulic composition.

<59>

Use described in the above <58>, wherein a hydraulic composition for centrifugal molding and a hydraulic composition for steam curing are excluded.

<60>

A dispersant composition for an inorganic powder containing: (A) a polymer compound having a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of the component (B) to the naphthalene ring-containing monomer unit in the component (A) is 0.4% or more and 30% or less,

[Chemical Formula 17]

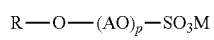 (B1)

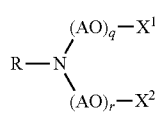 (B2)

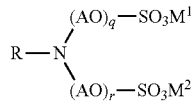 (B3)

wherein:

R is a hydrophobic group containing a carbon atom;

AO is an alkyleneoxy group having a carbon number of 2 or more and 4 or less;

p represents an average number of AO moles added and is 1 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

EXAMPLES

Example 1 and Comparative Example 1

(1) Preparation of Mortar

Into a mortar mixer (universal mixing stirrer, model: 5DM-03-γ manufactured by Dalton Corporation), a cement (C) and a fine aggregate (S) were fed and dry-mixed for 10 seconds at a low speed rotation (63 rpm) of the mortar mixer, and then mixing water (W) containing component (A), component (B) and an antifoaming agent was added. Then, the mixture was subjected to main kneading for 180 seconds at a low speed rotation (63 rpm) of the mortar mixer, so that a mortar was prepared.

Blending conditions for the mortar: 400 g of cement, 700 g of fine aggregate, and water/cement ratio (W/C)=30 mass %.

Components used are as follows.

Water (W): water from public water supply system (water temperature: 22° C.)

Cement (C): ordinary portland cement (mixture of two types: Taiheiyo Cement Corporation/Sumitomo Osaka Cement Co., Ltd=1/1, mass ratio), density: 3.16 g/cm³

Fine aggregate (S): pit sand from Joyo area, density: 2.55 g/cm³

Component (A): sodium salt of a formaldehyde naphthalenesulfonate condensate, weight average molecular weight: 15000 (described as Dispersant A in Table 1)

Component (B): compounds indicated in the Tables were used. Numerals in parentheses of compounds in the tables represent an average number of ethylene oxide moles added, and they indicate p in the general formula (B1) or q+r in the general formula (B2) or (B3). Note that in the Tables, compounds not corresponding to the component (B) are indicated in the columns for component (B) for convenience's sake.

The molecular weight of component (B) was calculated by software called ChemBioDraw (manufactured by PerkinElmer) based on the molecular formula of the compound.

Antifoaming agent: Foamlex 797 manufactured by Nicca Chemical Co., Ltd., was added in an amount of 0.05 g to the above blending of mortar.

(2) Evaluation of Fluidity

In accordance with the test method of JIS R 5201, the flow of the prepared mortar was measured. It should be noted that no operation for falling motion was conducted. Results are shown in Table 1.

TABLE 1

W/C = 30 mass %

| | | Component (A) | | Component (B) | | | | | | |
|---|---|---|---|---|---|---|---|---|---|---|
| | | Type | Added amount*1 (part by mass) | Type | Molecular weight | HLB of R—H*2 | Added amount*1 (part by mass) | Total added amount*3 | Molar ratio*4 (%) | Mortar flow (mm) |
| Examples | 1-1 | DispersantA | 0.64 | Polyoxyethylene (9) oleyl ether ammonium sulfate | 762 | −1.55 | 0.16 | 0.80 | 7.9 | 229 |
| | 1-2 | DispersantA | 0.52 | Polyoxyethylene (30) oleyl ether ammonium sulfate | 1687 | −1.55 | 0.28 | 0.80 | 7.7 | 277 |
| | 1-3 | DispersantA | 0.40 | Polyoxyethylene (60) oleyl ether ammonium sulfate | 3009 | −1.55 | 0.40 | 0.80 | 8.0 | 287 |
| | 1-4 | DispersantA | 0.61 | Polyoxyethylene (13) distyrenated phenyl ether ammonium sulfate | 972 | −3.45 | 0.19 | 0.80 | 7.8 | 186 |
| | 1-5 | DispersantA | 0.61 | Polyoxyethylene (14) tribenzylated phenyl ether ammonium sulfate | 1078 | −5.83 | 0.19 | 0.80 | 7.0 | 191 |
| | 1-6 | DispersantA | 0.40 | Polyoxyethylene (30) stearyl ether ammonium sulfate | 1689 | −1.55 | 0.40 | 0.80 | 14.3 | 270 |
| | 1-7 | DispersantA | 0.66 | Polyoxyethylene (10) decyl ether ammonium sulfate | 696 | 2.25 | 0.14 | 0.80 | 7.4 | 162 |
| | 1-8 | DispersantA | 0.70 | Polyoxyethylene (4) lauryl ether ammonium sulfate | 460 | 1.30 | 0.10 | 0.80 | 7.5 | 190 |
| | 1-9 | DispersantA | 0.57 | Polyoxyethylene (23) lauryl ether ammonium sulfate | 1297 | 1.30 | 0.23 | 0.80 | 7.5 | 238 |
| | 1-10 | DispersantA | 0.46 | Polyoxyethylene (47) lauryl ether ammonium sulfate | 2354 | 1.30 | 0.34 | 0.80 | 7.6 | 257 |
| | 1-11 | DispersantA | 0.48 | Polyoxyethylene (20) stearyl amine ether | 1151 | −1.55 | 0.32 | 0.80 | 14.0 | 203 |
| | 1-12 | DispersantA | 0.48 | Polyoxyethylene (20) stearyl amine ether ammonium sulfate | 1345 | −1.55 | 0.32 | 0.80 | 12.0 | 233 |
| Comparative Examples | 1-1 | DispersantA | 0.80 | — | — | — | — | 0.80 | — | 158 |
| | 1-2 | — | — | Polyoxyethylene (9) oleyl ether ammonium sulfate | 762 | −1.55 | 0.16 | 0.16 | — | 100 |
| | 1-3 | — | — | Polyoxyethylene (9) oleyl ether ammonium sulfate | 762 | −1.55 | 0.80 | 0.80 | — | 100 |
| | 1-4 | — | — | Polyoxyethylene (30) oleyl ether ammonium sulfate | 1687 | −1.55 | 0.28 | 0.28% | — | 100 |
| | 1-5 | — | — | Polyoxyethylene (30) oleyl ether ammonium sulfate | 1687 | −1.55 | 0.80 | 0.80 | — | 100 |
| | 1-6 | — | — | Polyoxyethylene (60) oleyl ether ammonium sulfate | 3009 | −1.55 | 0.40 | 0.40 | — | 100 |
| | 1-7 | — | — | Polyoxyethylene (60) oleyl ether ammonium sulfate | 3009 | −1.55 | 0.80 | 0.80 | — | 100 |
| | 1-8 | DispersantA | 0.67 | Polyoxyethylene (11) 2-ethylhexyl ether ammonium sulfate | 712 | 3.20 | 0.13 | 0.80 | 6.6 | 140 |
| | 1-9 | DispersantA | 0.53 | Polyoxyethylene (30) 2-ethylhexyl ether ammonium sulfate | 1549 | 3.20 | 0.27 | 0.80 | 8.0 | 125 |
| | 1-10 | DispersantA | 0.59 | Polyoxyethylene (14) tribenzylated phenyl ether | 1078 | −5.83 | 0.21 | 0.80 | 8.0 | 107 |
| | 1-11 | DispersantA | 0.71 | Oleyl sulfuric ester ammonium | 366 | −1.55 | 0.09 | 0.80 | 8.4 | 112 |
| | 1-12 | DispersantA | 0.72 | Polyoxyethylene (4) lauryl ether | 363 | 1.30 | 0.08 | 0.80 | 7.4 | 115 |

*1Added amount: added amount (part by mass) of component (A) or (B) relative to 100 parts by mass of cement
*2HLB of R—H: HLB value of a compound in the form of R—H, wherein the R is R in the general formula (B1), (B2) or (B3)
*3Total added amount: total added amount (part by mass) of components (A) and (B) relative to 100 parts by mass of cement
*4Molar ratio: molar ratio (%) of component (B) to a naphthalene ring-containing monomer unit in component (A)

In Table 1, Examples 1-1 to 1-12 having combined use of the components (A) and (B) at predetermined molar ratios provided a good mortar flow.

Meanwhile, it is understood from Comparative Examples 1-1 to 1-7 that use of either one of the components (A) and (B) did not provide a good mortar flow.

Further, it is understood from Comparative Examples 1-8 and 1-9 that when a compound having R in the general formula (B1) which is not a hydrophobic group was used in combination with the component (A), a good mortar flow could not be obtained.

Further, it is understood from Comparative Examples 1-10 to 1-12 that when a compound not corresponding to the component (B) was used in combination with the component (A), a good mortar flow could not be obtained.

In addition, mixing water with the components (A) and (B) corresponding to Examples 1-1 to 1-12 in Table 1 provides a dispersant composition for a hydraulic composition of the present invention. In this case, the dispersant composition for a hydraulic composition contains component (A), component (B) and water. The content of the component (A) is 20 to 40 mass %, and the component (B) is used at a molar ratio corresponding to the component (A). Water is used in such an amount that the entire of composition is 100 mass %. Such a one-part composition has a good stability, and when added amounts of the components (A) and (B) to cement are the same as those in Table 1, it provides a good mortar flow.

Example 2 and Comparative Example 2

Mortars were prepared in the same manner as in Example 1 and the fluidity was evaluated. However, added amounts of the components (A) and (B) relative to 100 parts by mass of cement were as indicated in Table 2. Results are shown in Table 2.

TABLE 2

| | | Component (A) | | Component (B) | | | | Total | | |
|---|---|---|---|---|---|---|---|---|---|---|
| | | Type | Added amount*[1] (part by mass) | Type | Molecular weight | HLB of R—H*[2] | Added amount*[1] (part by mass) | added amount*[3] (part by mass) | Molar ratio*[4] (%) | Mortar flow (mm) |
| Examples | 2-1 | DispersantA | 0.80 | Polyoxyethylene (30) oleyl ether ammonium sulfate | 1687 | −1.55 | 0.06 | 0.86 | 1.0 | 165 |
| | 2-2 | DispersantA | 0.80 | Polyoxyethylene (30) oleyl ether ammonium sulfate | 1687 | −1.55 | 0.11 | 0.91 | 2.0 | 199 |
| | 2-3 | DispersantA | 0.80 | Polyoxyethylene (30) oleyl ether ammonium sulfate | 1687 | −1.55 | 0.17 | 0.97 | 3.0 | 222 |
| | 2-4 | DispersantA | 0.80 | Polyoxyethylene (30) oleyl ether ammonium sulfate | 1687 | −1.55 | 0.44 | 1.24 | 7.9 | 280 |
| | 2-5 | DispersantA | 0.80 | Polyoxyethylene (30) oleyl ether ammonium sulfate | 1687 | −1.55 | 0.55 | 1.35 | 9.9 | 280 |
| | 2-6 | DispersantA | 0.80 | Polyoxyethylene (30) oleyl ether ammonium sulfate | 1687 | −1.55 | 1.66 | 2.46 | 29.7 | 163 |
| | 2-7 | DispersantA | 0.80 | Polyoxyethylene (20) stearyl amine ether | 1151 | −1.55 | 0.04 | 0.84 | 1.0 | 164 |
| | 2-8 | DispersantA | 0.80 | Polyoxyethylene (20) stearyl amine ether | 1151 | −1.55 | 0.30 | 1.10 | 7.9 | 281 |
| | 2-9 | DispersantA | 0.80 | Polyoxyethylene (20) stearyl amine ether | 1151 | −1.55 | 1.13 | 1.93 | 29.8 | 165 |
| | 2-10 | DispersantA | 0.80 | Polyoxyethylene (20) stearyl amine ether ammonium sulfate | 1345 | −1.55 | 0.04 | 0.84 | 1.0 | 171 |
| | 2-11 | DispersantA | 0.80 | Polyoxyethylene (20) stearyl amine ether ammonium sulfate | 1345 | −1.55 | 0.35 | 1.15 | 7.9 | 291 |
| | 2-12 | DispersantA | 0.80 | Polyoxyethylene (20) stearyl amine ether ammonium sulfate | 1345 | −1.55 | 1.32 | 2.12 | 29.8 | 173 |
| | 2-13 | DispersantA | 0.80 | Polyoxyethylene (30) oleyl ether ammonium sulfate | 1687 | −1.55 | 0.02 | 0.82 | 0.4 | 160 |
| Comparative Examples | 2-1 | DispersantA | 0.80 | — | — | — | — | 0.80 | — | 158 |
| | 2-2 | DispersantA | 0.80 | Polyoxyethylene (30) oleyl ether ammonium sulfate | 1687 | −1.55 | 0.01 | 0.81 | 0.2 | 125 |
| | 2-3 | DispersantA | 0.80 | Polyoxyethylene (30) oleyl ether ammonium sulfate | 1687 | −1.55 | 1.93 | 2.73 | 34.7 | 105 |
| | 2-4 | — | — | Polyoxyethylene (30) oleyl ether ammonium sulfate | 1687 | −1.55 | 0.50 | 0.50 | — | 100 |
| | 2-5 | — | — | Polyoxyethylene (30) oleyl ether ammonium sulfate | 1687 | −1.55 | 1.00 | 1.00 | — | 100 |
| | 2-6 | — | — | Polyoxyethylene (30) oleyl ether ammonium sulfate | 1687 | −1.55 | 2.00 | 2.00 | — | 100 |
| | 2-7 | DispersantA | 0.80 | Polyoxyethylene (20) stearyl amine ether | 1151 | −1.55 | 0.01 | 0.81 | 0.2 | 111 |
| | 2.8 | DispersantA | 0.80 | Polyoxyethylene (20) stearyl amine ether | 1151 | −1.55 | 1.32 | 2.12 | 34.7 | 105 |
| | 2-9 | — | — | Polyoxyethylene (20) stearyl amine ether | 1151 | −1.55 | 0.50 | 0.50 | — | 100 |
| | 2-10 | — | — | Polyoxyethyene (20) stearyl amine ether | 1151 | −1.55 | 1.00 | 1.00 | — | 100 |
| | 2-11 | — | — | Polyoxyethyene (20) stearyl amine ether | 1151 | −1.55 | 2.00 | 2.00 | — | 100 |
| | 2-12 | DispersantA | 0.80 | Polyoxyethylene (20) stearyl amine ether ammonium sulfate | 1345 | −1.55 | 0.01 | 0.809 | 0.2 | 134 |
| | 2-13 | DispersantA | 0.80 | Polyoxyethylene (20) stearyl amine ether ammonium sulfate | 1345 | −1.55 | 1.54 | 2.34 | 34.7 | 153 |
| | 2-14 | — | — | Polyoxyethylene (20) stearyl amine ether ammonium sulfate | 1345 | −1.55 | 0.50 | 0.50 | — | 100 |
| | 2-15 | — | — | Polyoxyethylene (20) stearyl amine ether ammonium sulfate | 1345 | −1.55 | 1.00 | 1.00 | — | 100 |
| | 2-16 | — | — | Polyoxyethylene (20) stearyl amine ether ammonium sulfate | 1345 | −1.55 | 2.00 | 2.00 | — | 100 |

*[1]Added amount: added amount (part by mass) of component (A) or (B) relative to 100 parts by mass of cement
*[2]HLB of R—H: HLB value of a compound in the form of R—H, wherein the R is R in the general formula (B1), (B2) or (B3)
*[3]Total added amount: total added amount (part by mass) of components (A) and (B) relative to 100 parts by mass of cement
*[4]Molar ratio: molar ratio (%) of component (B) to a naphthalene ring-containing monomer unit in component (A)

In Table 2, in Examples 2-1 to 2-13 wherein the components (A) and (B) were used at a predetermined molar ratio, a good mortar flow was obtained.

Meanwhile, it is understood from Comparative Examples 2-2, 2-3, 2-7, 2-8, 2-12 and 2-13 that when the components (A) and (B) were not used at a predetermined molar ratio, a good mortar flow could not be obtained.

Example 3 and Comparative Example 3

Mortars were prepared in the same manner as in Example 1, and the strength of a hardened product of mortar was measured by a fully automatic compression testing machine for concrete "CONCRETO 2000" (manufactured by Shimadzu Corporation). The strength refers to a strength 24 hours after kneading, and is indicated as 24-hour strength in the Table.

Note that blending conditions for mortar: the water/cement ratio (W/C); and the added amount of the components (A) and (B) relative to 100 parts by mass of cement were the same as those in Table 3. Further, as the cement, PCB-40 (manufactured by Nghi Son Cement Corporation) was used.

Results are shown in Table 3.

TABLE 3

| | | Component (A) | | Component (B) | | | | Total | | | |
|---|---|---|---|---|---|---|---|---|---|---|---|
| | | | | | | | | W/C = 35 mass % | | | |
| | | Type | Added amount*1 (part by mass) | Type | Molecular weight | HLB of R—H*2 | Added amount*1 (part by mass) | added amount*3 (part by mass) | Molar ratio*4 (%) | 24-hour strength (N/mm²) | Strength ratio*5 (%) |
| Examples | 3-1 | DispersantA | 0.431 | Polyoxyethylene (11.6) stearyl ether ammonium sulfate | 879 | −1.55 | 0.009 | 0.44 | 0.6 | 45.1 | 116% |
| | 3-2 | DispersantA | 0.418 | Polyoxyethylene (11.6) stearyl ether ammonium sulfate | 879 | −1.55 | 0.022 | 0.44 | 1.5 | 46.2 | 118% |
| | 3-3 | DispersantA | 0.396 | Polyoxyethylene (11.6) stearyl ether ammonium sulfate | 879 | −1.55 | 0.044 | 0.44 | 3.1 | 47.3 | 121% |
| | 3-4 | DispersantA | 0.374 | Polyoxyethylene (11.6) stearyl ether ammonium sulfate | 879 | −1.55 | 0.066 | 0.44 | 4.9 | 47.5 | 122% |
| | 3-5 | DispersantA | 0.352 | Polyoxyethylene (11.6) stearyl ether ammonium sulfate | 879 | −1.55 | 0.088 | 0.44 | 6.9 | 48.1 | 123% |
| | 3-6 | DispersantA | 0.308 | Polyoxyethylene (11.6) stearyl ether ammonium sulfate | 879 | −1.55 | 0.132 | 0.44 | 11.8 | 48.5 | 124% |
| | 3-7 | DispersantA | 0.352 | Polyoxyethylene (7) oleyl ether ammonium sulfate | 674 | −1.55 | 0.088 | 0.44 | 9.0 | 49.9 | 128% |
| | 3-8 | DispersantA | 0.352 | Polyoxyethylene (9) stearyl ether ammonium sulfate | 764 | −1.55 | 0.088 | 0.44 | 7.9 | 49.0 | 126% |
| | 3-9 | DispersantA | 0.352 | Polyoxyethylene (13.5) stearyl ether ammonium sulfate | 962 | −1.55 | 0.088 | 0.44 | 6.3 | 49.1 | 126% |
| | 3-10 | DispersantA | 0.352 | Polyoxyethylene (11.6) stearyl ether ammonium sulfate | 885 | −1.55 | 0.088 | 0.44 | 6.8 | 48.4 | 124% |
| | 3-11 | DispersantA | 0.352 | Polyoxyethylene (11.6) mixed alkyl ether ammonium sulfateC (C18/C16 = 80/20) | 873 | −1.55 | 0.088 | 0.44 | 6.9 | 49.0 | 126% |
| | 3-12 | DispersantA | 0.352 | Polyoxyethylene (11.6) stearyl ether ammonium sulfate (sulfate esterification with sulfurous acid gas) | 879 | −1.55 | 0.088 | 0.44 | 6.9 | 48.8 | 125% |
| | 3-13 | DispersantA | 0.352 | Polyoxyethylene (13) distyrenated phenyl ether ammonium sulfate | 972 | −3.45 | 0.088 | 0.44 | 6.2 | 49 | 126% |
| | 3-14 | DispersantA | 0.396 | Polyoxyethylene (40) distyrenated phenyl ether ammonium sulfate | 2162 | −3.45 | 0.044 | 0.44 | 1.2 | 48.1 | 123% |
| | 3-15 | DispersantA | 0.396 | Polyoxyethylene (13) distyrenated phenyl ether ammonium sulfate | 972 | −3.45 | 0.044 | 0.44 | 2.8 | 48.8 | 125% |
| | 3-16 | DispersantA | 0.418 | Polyoxyethylene (13) distyrenated phenyl ether ammonium sulfate | 972 | −3.45 | 0.022 | 0.44 | 1.3 | 48.5 | 124% |
| | 3-17 | DispersantA | 0.431 | Polyoxyethylene (13) distyrenated phenyl ether ammonium sulfate | 972 | −3.45 | 0.009 | 0.44 | 0.5 | 48.3 | 124% |
| | 3-18 | DispersantA | 0.352 | Polyoxyethylene (14) tribenzylated phenyl ether ammonium sulfate | 1078 | −5.83 | 0.088 | 0.44 | 5.6 | 49.1 | 126% |
| | 3-19 | DispersantA | 0.352 | Polyoxyethylene (20) stearyl amine ether ammonium sulfate | 1345 | −1.55 | 0.088 | 0.44 | 4.5 | 47.5 | 122% |

TABLE 3-continued

W/C = 35 mass %

| | | Component (A) | | Component (B) | | | | Total | | | |
|---|---|---|---|---|---|---|---|---|---|---|---|
| | | Type | Added amount*1 (part by mass) | Type | Molecular weight | HLB of R—H*2 | Added amount*1 (part by mass) | added amount*3 (part by mass) | Molar ratio*4 (%) | 24-hour strength (N/mm²) | Strength ratio*5 (%) |
| Comparative Examples | 3-1 | DispersantA | 0.440 | — | — | — | — | 0.44 | — | 39 | 100% |
| | 3-2 | DispersantA | 0.436 | Polyoxyethylene (11.6) stearyl ether ammonium sulfate | 879 | −1.55 | 0.004 | 0.44 | 0.3 | 39.5 | 101% |
| | 3-3 | DispersantA | 0.198 | Polyoxyethylene (11.6) steartyl ether ammonium sulfate | 879 | −1.55 | 0.242 | 0.44 | 33.7 | 25.3 | 65% |

*1Added amount: added amount (part by mass) of component (A) or (B) relative to 100 parts by mass of cement
*2HLB of R—H: HLB value of a compound in the form of R—H, wherein the R is R in the general formula (B1), (B2) or (B3)
*3Total added amount: total added amount (part by mass) of components (A) and (B) relative to 100 parts by mass of cement
*4Molar ratio: molar ratio (%) of component (B) to a naphthalene ring-containing monomer unit in component (A)
*5Strength ratio: ratio when the 24-hour strength of Comparative Example 3-1 is taken as 100%

Table 3 shows that high strengths were obtained over a wide range of the ratios (%) of the component (B) to the naphthalene ring-containing monomer unit in the component (A).

The invention claimed is:

1. A dispersant composition for a hydraulic composition, comprising (A) a polymer compound having a molecular weight of 5000 or more and containing a naphthalene ring-containing monomer unit; and (B) one or two or more compounds selected from a compound represented by the following general formula (B1), a compound represented by the following general formula (B2) and a compound represented by the following general formula (B3),
wherein a molar ratio of a total amount of (B) to the naphthalene ring-containing monomer unit in (A) is 0.4% or more and 30% or less,

[Chemical Formula 1]

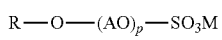

(B1)

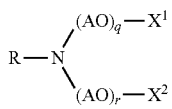

(B2)

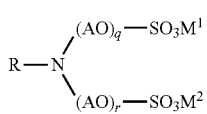

(B3)

wherein:
R is a hydrophobic group containing a carbon atom, and providing an HLB of a compound in the form of R—H of 1.30 or less;
AO is an alkyleneoxy group having a carbon number of 2 or more and 4 or less;
p represents an average number of AO moles added and is 5 or more and 200 or less;
q and r are the same or different and each represents an average number of AO moles added and is 0 or more, and q+r is 1 or more and 200 or less;
M, M¹ and M² are the same or different and each represents a counter ion; and
X¹ and X² are the same or different, and each represents a hydrogen atom or a hydrocarbon group having a carbon number of 1 or more and 4 or less.

2. The dispersant composition for a hydraulic composition according to claim 1, further comprising (C) an antifoaming agent.

3. The dispersant composition for a hydraulic composition according to claim 1, wherein the component (A) is a formaldehyde naphthalenesulfonate condensate or a salt thereof.

4. A hydraulic composition comprising a hydraulic powder, water, (A) a polymer compound having a molecular weight of 5000 or more and containing a naphthalene ring-containing monomer unit, and (B) one or two or more compounds selected from a compound represented by the following general formula (B1), a compound represented by the following general formula (B2) and a compound represented by the following general formula (B3),
wherein a molar ratio of a total amount of (B) to the naphthalene ring-containing monomer unit in (A) is 0.4% or more and 30% or less,

[Chemical Formula 2]

(B1)

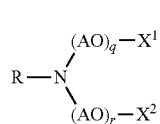

(B2)

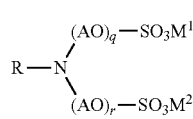

(B3)

wherein:
R is a hydrophobic group containing a carbon atom, and providing an HLB of a compound in the form of R—H of 1.30 or less;
AO is an alkyleneoxy group having a carbon number of 2 or more and 4 or less;
p represents an average number of AO moles added and is 5 or more and 200 or less;
q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

5. The hydraulic composition according to claim 4, further comprising (C) an antifoaming agent.

6. The hydraulic composition according to claim 4, wherein (A) is a formaldehyde naphthalenesulfonate condensate or a salt thereof.

7. The hydraulic composition according to claim 4, wherein (A) is contained in an amount of 0.001 parts by mass or more and 10 parts by mass or less relative to 100 parts by mass of the hydraulic powder.

8. The hydraulic composition according to claim 4, wherein (B) is contained in an amount of 0.0001 parts by mass or more and 10 parts by mass or less relative to 100 parts by mass of the hydraulic powder.

9. A method for manufacturing a dispersant composition for a hydraulic composition, wherein the dispersant composition comprises: (A) a polymer compound having a molecular weight of 5000 or more and containing a naphthalene ring-containing monomer unit; and (B) one or two or more compounds selected from a compound represented by the following general formula (B1), a compound represented by the following general formula (B2) and a compound represented by the following general formula (B3), the method comprising mixing (A) and (B) so that a molar ratio of a total amount of (B) to the naphthalene ring-containing monomer unit in (A) is 0.4% or more and 30% or less,

[Chemical Formula 3]

(B1)

(B2)

(B3)

wherein:

R is a hydrophobic group containing a carbon atom, and providing an HLB of a compound in the form of R—H of 1.30 or less;

AO is an alkyleneoxy group having a carbon number of 2 or more and 4 or less;

p represents an average number of AO moles added and is 5 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

10. A method for manufacturing a hydraulic composition, wherein the hydraulic composition comprises a hydraulic powder, water, (A) a polymer compound having a molecular weight of 5000 or more and containing a naphthalene ring-containing monomer unit, and (B) one or two or more compounds selected from a compound represented by the following general formula (B1), a compound represented by the following general formula (B2) and a compound represented by the following general formula (B3), the method comprising mixing (A) and (B) so that a molar ratio of a total amount of (B) to the naphthalene ring-containing monomer unit in (A) is 0.4% or more and 30% or less,

[Chemical Formula 4]

(B1)

(B2)

(B3)

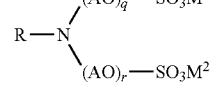

wherein:

R is a hydrophobic group containing a carbon atom, and providing an HLB of a compound in the form of R—H of 1.30 or less;

AO is an alkyleneoxy group having a carbon number of 2 or more and 4 or less;

p represents an average number of AO moles added and is 5 or more and 200 or less;

q and r are the same or different and each represents an average number of AO moles added and is 0 or more, and q+r is 1 or more and 200 or less;

M, $M^1$ and $M^2$ are the same or different and each represents a counter ion; and $X^1$ and $X^2$ are the same or different, and each represents a hydrogen atom or a hydrocarbon group having a carbon number of 1 or more and 4 or less.

11. A dispersant composition for an inorganic powder, comprising: (A) a polymer compound having a molecular weight of 5000 or more and containing a naphthalene ring-containing monomer unit; and (B) one or two or more compounds selected from a compound represented by the following general formula (B1), a compound represented by the following general formula (B2) and a compound represented by the following general formula (B3), wherein a molar ratio of a total amount of (B) to the naphthalene ring-containing monomer unit in (A) is 0.4% or more and 30% or less,

[Chemical Formula 6]

(B1)

(B2)

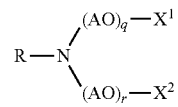

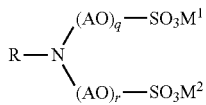
(B3)

wherein:
R is a hydrophobic group containing a carbon atom, and providing an HLB of a compound in the form of R—H of 1.30 or less;
AO is an alkyleneoxy group having a carbon number of 2 or more and 4 or less;
p represents an average number of AO moles added and is 5 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

12. The dispersant composition for an inorganic powder according to claim 11, further comprising (C) an antifoaming agent.

13. The dispersant composition for an inorganic powder according to claim 11, wherein (A) is a formaldehyde naphthalenesulfonate condensate or a salt thereof.

14. The dispersant composition for a hydraulic composition according to claim 2, wherein the component (A) is a formaldehyde naphthalenesulfonate condensate or a salt thereof.

15. The hydraulic composition according to claim 5, wherein (A) is a formaldehyde naphthalenesulfonate condensate or a salt thereof.

16. The hydraulic composition according to claim 5, wherein (A) is contained in an amount of 0.001 parts by mass or more and 10 parts by mass or less relative to 100 parts by mass of the hydraulic powder.

17. The hydraulic composition according to claim 5, wherein (B) is contained in an amount of 0.0001 parts by mass or more and 10 parts by mass or less relative to 100 parts by mass of the hydraulic powder.

18. A method for improving dispersing performance of (A) a polymer compound having a molecular weight of 5000 or more and containing a naphthalene ring-containing monomer unit for a hydraulic powder, the method comprising adding (B), one or two or more compounds selected from a compound represented by the following general formula (B1), a compound represented by the following general formula (B2) and a compound represented by the following general formula (B3) so that a molar ratio of a total amount of (B) to the naphthalene ring-containing monomer unit in (A) is 0.4% or more and 30% or less,

[Chemical Formula 5]

(B1)

(B2)

(B3)

wherein:
R is a hydrophobic group containing a carbon atom, and providing an HLB of a compound in the form of R—H of 1.30 or less;
AO is an alkyleneoxy group having a carbon number of 2 or more and 4 or less;
p represents an average number of AO moles added and is 5 or more and 200 or less;
q and r are the same or different and each represents an average number of AO moles added and is 0 or more, and q+r is 1 or more and 200 or less;
M, $M^1$ and $M^2$ are the same or different and each represents a counter ion; and
$X^1$ and $X^2$ are the same or different, and each represents a hydrogen atom or a hydrocarbon group having a carbon number of 1 or more and 4 or less.

19. The dispersant composition for an inorganic powder according to claim 12, wherein (A) is a formaldehyde naphthalenesulfonate condensate or a salt thereof.

* * * * *